United States Patent
Lee et al.

(10) Patent No.: US 12,101,826 B2
(45) Date of Patent: Sep. 24, 2024

(54) METHOD OF PERFORMING RANDOM ACCESS (RA) PROCEDURE, AND TRANSMITTING DEVICE, APPARATUS AND STORAGE MEDIUM THEREFOR, AND METHOD AND APPARATUS FOR TRANSMITTING MAC PDU OF RA PROCEDURE

(71) Applicant: LG Electronics Inc., Seoul (KR)

(72) Inventors: Eunjong Lee, Seoul (KR); Heejeong Cho, Seoul (KR); Seungjune Yi, Seoul (KR); Jeonggu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 351 days.

(21) Appl. No.: 17/613,693

(22) PCT Filed: May 22, 2020

(86) PCT No.: PCT/KR2020/006693
§ 371 (c)(1),
(2) Date: Nov. 23, 2021

(87) PCT Pub. No.: WO2020/235956
PCT Pub. Date: Nov. 26, 2020

(65) Prior Publication Data
US 2022/0232623 A1 Jul. 21, 2022

(30) Foreign Application Priority Data
May 23, 2019 (KR) .......................... 10-2019-0060428

(51) Int. Cl.
*H04W 74/0833* (2024.01)
*H04W 72/0446* (2023.01)
(Continued)

(52) U.S. Cl.
CPC ..... *H04W 74/085* (2013.01); *H04W 72/0446* (2013.01); *H04W 72/23* (2023.01); *H04W 74/0866* (2013.01); *H04W 80/02* (2013.01)

(58) Field of Classification Search
CPC .......... H04W 74/085; H04W 72/0446; H04W 72/23; H04W 74/0866; H04W 80/02;
(Continued)

(56) References Cited

U.S. PATENT DOCUMENTS

| | | | |
|---|---|---|---|
| 2020/0100299 A1* | 3/2020 | Loehr | H04W 76/11 |
| 2020/0107372 A1* | 4/2020 | Agiwal | H04W 24/08 |
| 2020/0260498 A1* | 8/2020 | Xu | H04W 74/0833 |

FOREIGN PATENT DOCUMENTS

WO WO2018135199 7/2018

OTHER PUBLICATIONS

International Search Report and Written Opinion in International Appln. No. PCT/KR2020/006693, dated Sep. 11, 2020, 12 pages.
(Continued)

*Primary Examiner* — Thai Nguyen
(74) *Attorney, Agent, or Firm* — Fish & Richardson P.C.

(57) ABSTRACT

In the present disclosure, a UE transmits a random access preamble (RAP) on a physical random access channel (PRACH) and a control channel (CCCH) service data unit (SDU) on a physical uplink shared channel (PUSCH); and receives a medium access control (MAC) protocol data unit (PDU) based on transmitting the RAP and the CCCH SDU. The MAC PDU includes a MAC subheader. The MAC subheader includes a first indicator field regarding whether the MAC subheader include an RAP identity (ID) or not. The MAC subheader further includes a second indicator field regarding whether the MAC subheader includes a
(Continued)

backoff indicator field or not, based on the first indicator field set to a value indicating that the MAC subheader does not include an RAP ID.

11 Claims, 18 Drawing Sheets

(51) Int. Cl.
*H04W 72/23* (2023.01)
*H04W 74/08* (2009.01)
*H04W 80/02* (2009.01)

(58) Field of Classification Search
CPC ......... H04W 74/0833; H04W 56/0045; H04W 74/0841; H04W 74/002; H04L 1/0041; H04L 1/0045; H04L 5/0092
See application file for complete search history.

(56) References Cited

OTHER PUBLICATIONS

LG Electronics Inc., "Completion of 2-Step RACH procedure," R2-1906572 (Revision of R2-1903729), Presented at 3GPP TSG-RAN WG2 Meeting #106, Reno, USA, May 13-17, 2019, 3 pages.
LG Electronics Inc., "Contents in MAC layer of msgA and msgB," R2-1903731, Presented at 3GPP TSG-RAN WG2 Meeting #105bis, Xi'an, China, Apr. 8-12, 2019, 4 pages.
Vivo, "Fallback Procedure from 2-step RACH to 4-step RACH," R2-1905651, Presented at 3GPP TSG-RAN WG2 Meeting #106, Reno, USA, May 13-17, 2019, 4 pages.
ZTE, Sanechips, "MsgB content and format," R2-1906306, Presented at 3GPP TSG-WG2 Meeting #106, USA, Reno, May 13-17, 2019, 13 pages.

* cited by examiner

FIG. 4
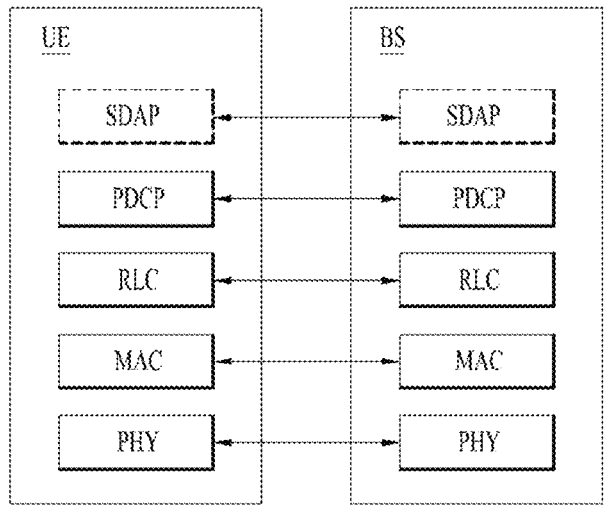
(a) User Plane Protocol Stack
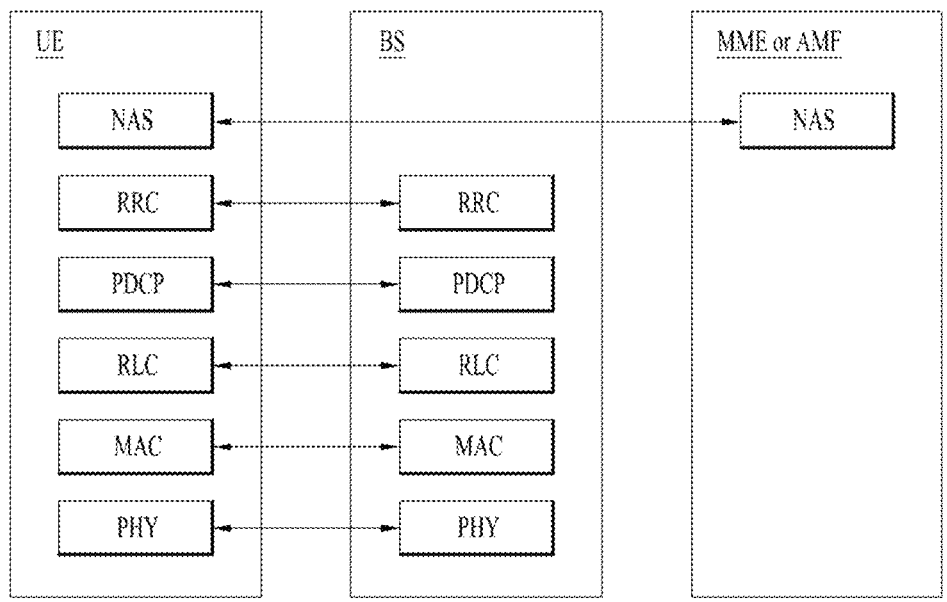
(b) Control Plane Protocol Stack

FIG. 10
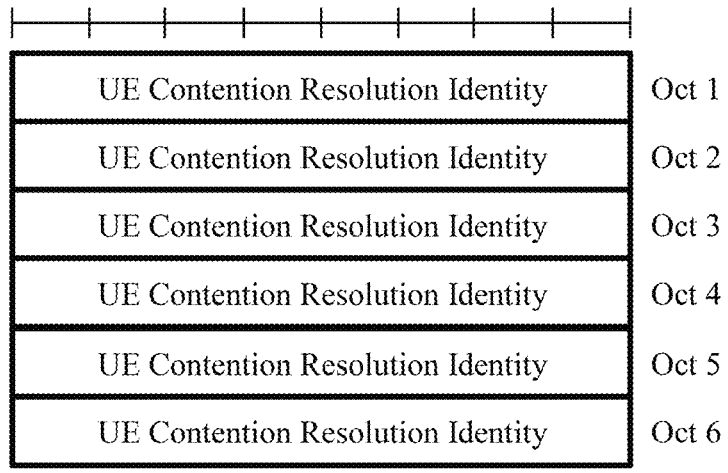
FIG. 11
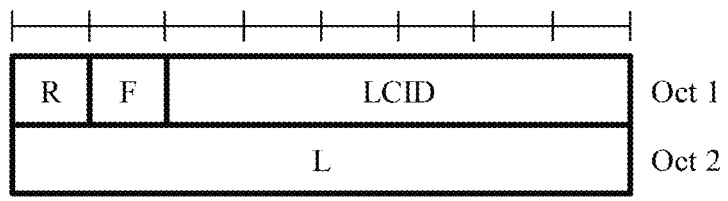
(a) R/F/LCID/L MAC subheader with 8-bit L field
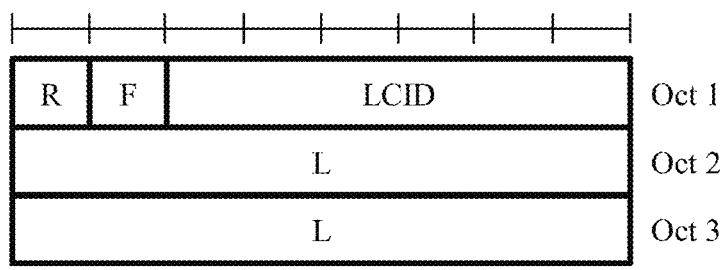
(b) R/F/LCID/L MAC subheader with 16-bit L field
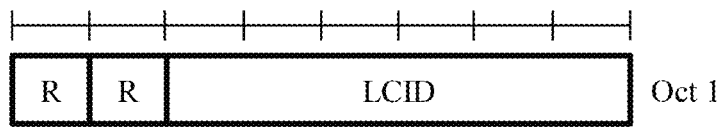
(c) R/LCID MAC subheader

FIG. 13
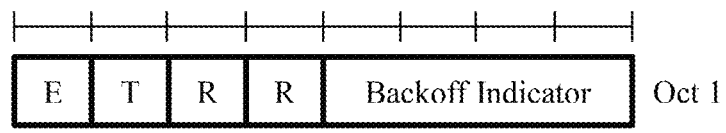
(a) E/T/R/R/BI MAC subheader
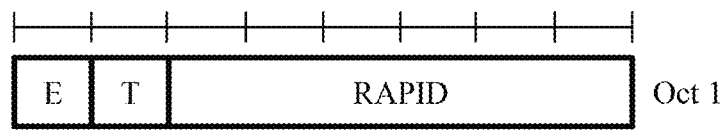
(b) E/T/RAPID MAC subheader
FIG. 14
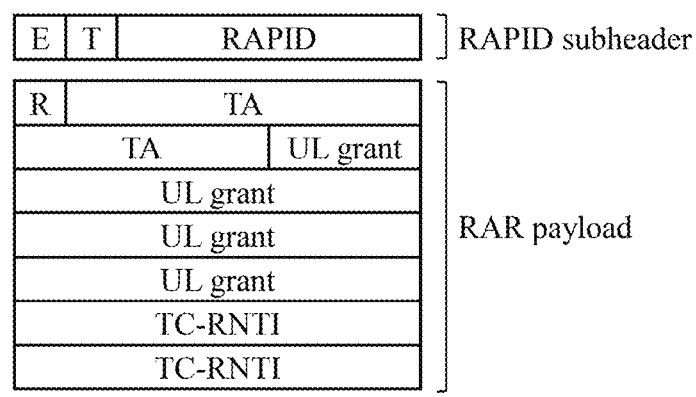

METHOD OF PERFORMING RANDOM ACCESS (RA) PROCEDURE, AND TRANSMITTING DEVICE, APPARATUS AND STORAGE MEDIUM THEREFOR, AND METHOD AND APPARATUS FOR TRANSMITTING MAC PDU OF RA PROCEDURE

CROSS-REFERENCE TO RELATED APPLICATIONS

This application is a National Stage application under 35 U.S.C. § 371 of International Application No. PCT/KR2020/006693, filed on May 22, 2020, which claims the benefit of Korean Application No. 10-2019-0060428, filed on May 23, 2019. The disclosures of the prior applications are incorporated by reference in their entirety.

TECHNICAL FIELD

The present invention relates to a wireless communication system.

BACKGROUND ART

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information.

DISCLOSURE OF INVENTION

Technical Problem

Various types of signals, including data signals and control signals, are communicated via uplink (UL) and downlink (DL). Scheduling of such communications is typically performed, to achieve improved efficiency, latency, and/or reliability. Overcoming delay or latency has become an important challenge in applications whose performance critically depends on delay/latency.

The technical objects that can be achieved through the present invention are not limited to what has been particularly described hereinabove and other technical objects not described herein will be more clearly understood by persons skilled in the art from the following detailed description.

Solution to Problem

As an aspect of the present disclosure, provided herein is a method for performing a random access (RA) procedure by a user equipment (UE) in a wireless communication system. The method comprises: transmitting a random access preamble (RAP) on a physical random access channel (PRACH) and a common control channel (CCCH) service data unit (SDU) on a physical uplink shared channel (PUSCH); and receiving a medium access control (MAC) protocol data unit (PDU) based on transmitting the RAP and the CCCH SDU. The MAC PDU includes a MAC subheader. The MAC subheader includes a first indicator field regarding whether the MAC subheader include an RAP identity (ID) or not. The MAC subheader further includes a second indicator field regarding whether the MAC subheader includes a backoff indicator field or not, based on the first indicator field set to a value indicating that the MAC subheader does not include an RAP ID.

As another aspect of the present disclosure, provided herein is a user equipment (UE) of performing a random access (RA) procedure in a wireless communication system. The UE comprises: at least one transceiver; at least one processor; and at least one computer memory storing instructions which, when executed, cause the at least one processor to perform operations. The operations comprise: transmitting a random access preamble (RAP) on a physical random access channel (PRACH) and a common control channel (CCCH) service data unit (SDU) on a physical uplink shared channel (PUSCH); and receiving a medium access control (MAC) protocol data unit (PDU) based on transmitting the RAP and the CCCH SDU. The MAC PDU includes a MAC subheader. The MAC subheader includes a first indicator field regarding whether the MAC subheader include an RAP identity (ID) or not. The MAC subheader further includes a second indicator field regarding whether the MAC subheader includes a backoff indicator field or not, based on the first indicator field set to a value indicating that the MAC subheader does not include an RAP ID.

As a further aspect of the present disclosure, provided herein is an apparatus for a user equipment (UE). The apparatus comprises: at least one processor; and at least one computer memory storing instructions which, when executed, cause the at least one processor to perform operations. The operations comprise: transmitting a random access preamble (RAP) on a physical random access channel (PRACH) and a common control channel (CCCH) service data unit (SDU) on a physical uplink shared channel (PUSCH); and receiving a medium access control (MAC) protocol data unit (PDU) based on transmitting the RAP and the CCCH SDU. The MAC PDU includes a MAC subheader. The MAC subheader includes a first indicator field regarding whether the MAC subheader include an RAP identity (ID) or not. The MAC subheader further includes a second indicator field regarding whether the MAC subheader includes a backoff indicator field or not, based on the first indicator field set to a value indicating that the MAC subheader does not include an RAP ID.

As a still further aspect of the present disclosure, provided herein is a computer readable storage medium storing at least one program that includes instructions which, when executed, cause the at least one processor to perform operations. The operations comprise: transmitting a random access preamble (RAP) on a physical random access channel (PRACH) and a common control channel (CCCH) service data unit (SDU) on a physical uplink shared channel (PUSCH); and receiving a medium access control (MAC) protocol data unit (PDU) based on transmitting the RAP and the CCCH SDU. The MAC PDU includes a MAC subheader. The MAC subheader includes a first indicator field regarding whether the MAC subheader include an RAP identity (ID) or not. The MAC subheader further includes a second indicator field regarding whether the MAC subheader includes a backoff indicator field or not, based on the first indicator field set to a value indicating that the MAC subheader does not include an RAP ID.

As a still further aspect of the present disclosure, provided herein is a method for transmitting a medium access control (MAC) protocol data unit (PDU) of a random access (RA) procedure by a base station (BS) in a wireless communication system. The method comprises: receiving a random access preamble (RAP) on a physical random access channel (PRACH) and a common control channel (CCCH) service data unit (SDU) on a physical uplink shared channel (PUSCH) from a user equipment (UE); generating a medium access control (MAC) protocol data unit (PDU) based on receiving the RAP and the CCCH SDU; and transmitting the MAC PDU to the UE. The MAC PDU includes a MAC subheader. The MAC subheader includes a first indicator field regarding whether the MAC subheader include an RAP identity (ID) or not. The MAC subheader further includes a second indicator field regarding whether the MAC subheader includes a backoff indicator field or not, based on the first indicator field set to a value indicating that the MAC subheader does not include an RAP ID.

As a still further aspect of the present disclosure, provided herein is a base station (BS) of transmitting a medium access control (MAC) protocol data unit (PDU) of a random access (RA) procedure in a wireless communication system. The BS comprises: at least one transceiver; at least one processor; and at least one computer memory storing instructions which, when executed, cause the at least one processor to perform operations. The operations comprise:

In each aspect of the present disclosure, the MAC PDU may further include a CRID field related to the MAC subheader based on the second indicator field set to a value indicating that the MAC subheader does not include a backoff indicator field.

In each aspect of the present disclosure, the method at the UE, the operations of the UE, the operations of the apparatus and/or the operations of the computer readable storage medium may further comprise: determining whether a CRID included in the CRID field matches the CCCH SDU; and processing a timing advance command related to the CRID based on determining that the CRID included in the CRID field matches the CCCH SDU.

In each aspect of the present disclosure, the method at the UE, the operations of the UE, the operations of the apparatus and/or the operations of the computer readable storage medium may further comprise: determining whether a CRID included in the CRID field matches the CCCH SDU; and processing a cell radio network temporary identity (C-RNTI) related to the CRID based on determining that the CRID included in the CRID field matches the CCCH SDU.

In each aspect of the present disclosure, the MAC subheader may not include the second indicator field, based on the first indicator field set to a value indicating that the MAC PDU includes an RAP ID.

In each aspect of the present disclosure, the MAC PDU may not include the CRID field related to the MAC subheader, based on the second indicator set to a value indicating that the MAC subheader includes a backoff indicator field.

The above technical solutions are merely some parts of the implementations of the present disclosure and various implementations into which the technical features of the present disclosure are incorporated can be derived and understood by persons skilled in the art from the following detailed description of the present disclosure.

Advantageous Effects of Invention

In some scenarios, implementations of the present disclosure may provide one or more of the following advantages. In some scenarios, radio communication signals can be more efficiently transmitted and/or received. Therefore, overall throughput of a radio communication system can be improved.

According to some implementations of the present disclosure, delay/latency occurring during communication between a user equipment and a BS may be reduced.

Also, signals in a new radio access technology system can be transmitted and/or received more effectively.

It will be appreciated by persons skilled in the art that the effects that can be achieved through the present disclosure are not limited to what has been particularly described hereinabove and other advantages of the present disclosure will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention:

FIG. 4 illustrates an example of protocol stacks in a third generation partnership project (3GPP) based wireless communication system;

FIG. 10 illustrates an example of a UE contention resolution identity MAC control element (CE) for some implementations of the present disclosure;

FIG. 11 illustrates examples of MAC subheader used in a MAC PDU for DL-SCH and UL-SCH;

FIG. 13 illustrates examples of MAC subheader related to RAR;

FIG. 14 illustrates an example of a part of a MAC PDU for RAR in some implementations of the present disclosure;

MODE FOR THE INVENTION

Figure 1:
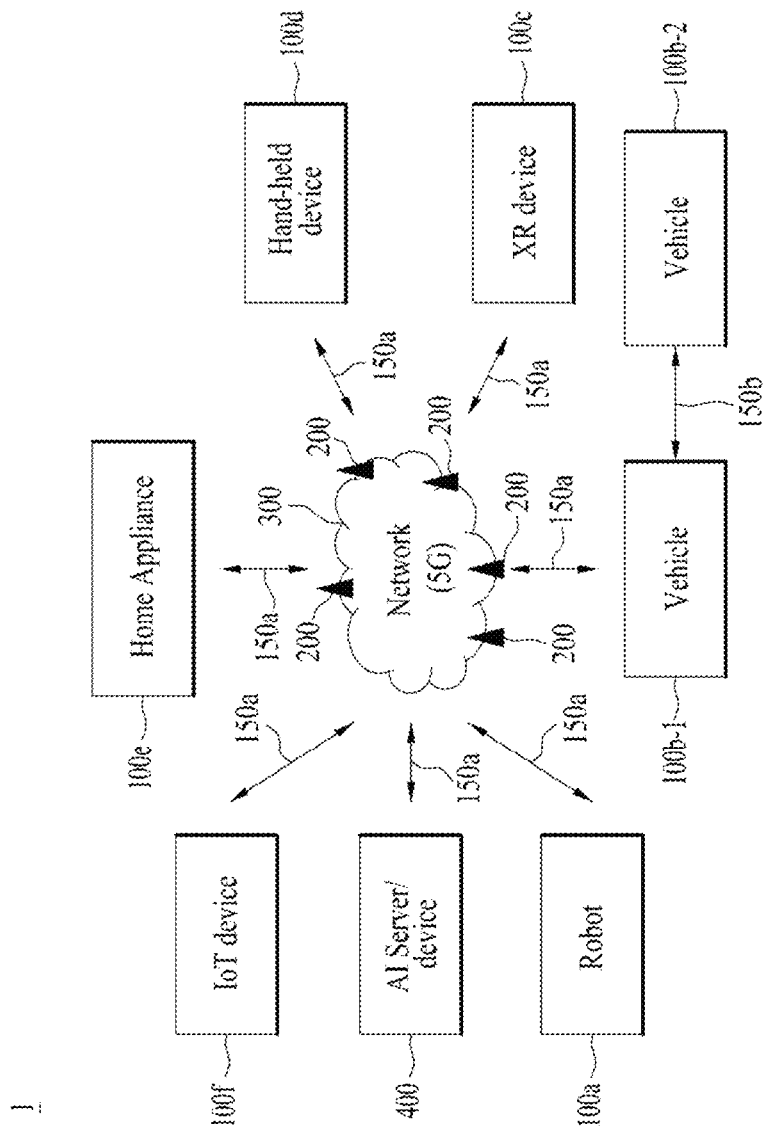
FIG. 1 illustrates an example of a communication system 1 to which implementations of the present disclosure is applied.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced. For example, the following documents may be referenced.

3GPP LTE
   3GPP TS 36.211: Physical channels and modulation
   3GPP TS 36.212: Multiplexing and channel coding
   3GPP TS 36.213: Physical layer procedures
   3GPP TS 36.214: Physical layer; Measurements
   3GPP TS 36.300: Overall description
   3GPP TS 36.304: User Equipment (UE) procedures in idle mode
   3GPP TS 36.314: Layer 2—Measurements
   3GPP TS 36.321: Medium Access Control (MAC) protocol
   3GPP TS 36.322: Radio Link Control (RLC) protocol
   3GPP TS 36.323: Packet Data Convergence Protocol (PDCP)
   3GPP TS 36.331: Radio Resource Control (RRC) protocol 3GPP NR (e.g. 5G)
   3GPP TS 38.211: Physical channels and modulation
   3GPP TS 38.212: Multiplexing and channel coding
   3GPP TS 38.213: Physical layer procedures for control
   3GPP TS 38.214: Physical layer procedures for data
   3GPP TS 38.215: Physical layer measurements
   3GPP TS 38.300: Overall description
   3GPP TS 38.304: User Equipment (UE) procedures in idle mode and in RRC inactive state
   3GPP TS 38.321: Medium Access Control (MAC) protocol
   3GPP TS 38.322: Radio Link Control (RLC) protocol
   3GPP TS 38.323: Packet Data Convergence Protocol (PDCP)
   3GPP TS 38.331: Radio Resource Control (RRC) protocol
   3GPP TS 37.324: Service Data Adaptation Protocol (SDAP)
   3GPP TS 37.340: Multi-connectivity; Overall description In the present disclosure, a user equipment (UE) may be a fixed or mobile device. Examples of the UE include various devices that transmit and receive user data and/or various kinds of control information to and from a base station (BS). In the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the enhanced packet core (EPC)/long term evolution (LTE) system is referred to as an eNB, and a BS of the new radio (NR) system is referred to as a gNB.

In the present disclosure, a node refers to a point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and an uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In the present disclosure, a physical downlink control channel (PDCCH), and a physical downlink shared channel (PDSCH) refer to a set of time-frequency resources or resource elements (REs) carrying downlink control information (DCI), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and an uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection reestablishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. In the present disclosure, for dual connectivity (DC) operation, the term "special Cell" refers to the PCell of the master cell group (MCG) or the PSCell of the secondary cell group (SCG), and otherwise the term Special Cell refers to the PCell. An SpCell supports physical uplink control channel (PUCCH) transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with DC. For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells.

The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In DC, two MAC entities are configured in the UE: one for the MCG and one for the SCG. Each MAC entity is configured by RRC with a serving cell supporting PUCCH transmission and contention based Random Access. In the present disclosure, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, monitoring a channel refers to attempting to decode the channel. For example, monitoring a physical downlink control channel (PDCCH) refers to attempting to decode PDCCH(s) (or PDCCH candidates).

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, "SPS C-RNTI" refers to a semi-persistent scheduling C-RNTI, and "CS-RNTI" refers to a configured scheduling RNTI.

FIG. 1 illustrates an example of a communication system 1 to which implementations of the present disclosure is applied.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices, base stations (BSs), and a network. Although FIG. 1 illustrates a 5G network as an example of the network of the communication system 1, the implementations of the present disclosure are not limited to the 5G system, and can be applied to the future communication system beyond the 5G system.

The BSs and the network may be implemented as wireless devices and a specific wireless device 200a may operate as a BS/network node with respect to other wireless devices.

The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field. The unmanned aerial vehicle (UAV) may be, for example, an aircraft aviated by a wireless control signal without a human being onboard. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sales (POS) system. The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200-BS 200. Herein, the wireless communication/connections may be established through various RATs (e.g., 5G NR) such as uplink/downlink communication 150a and sidelink communication 150b (or D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
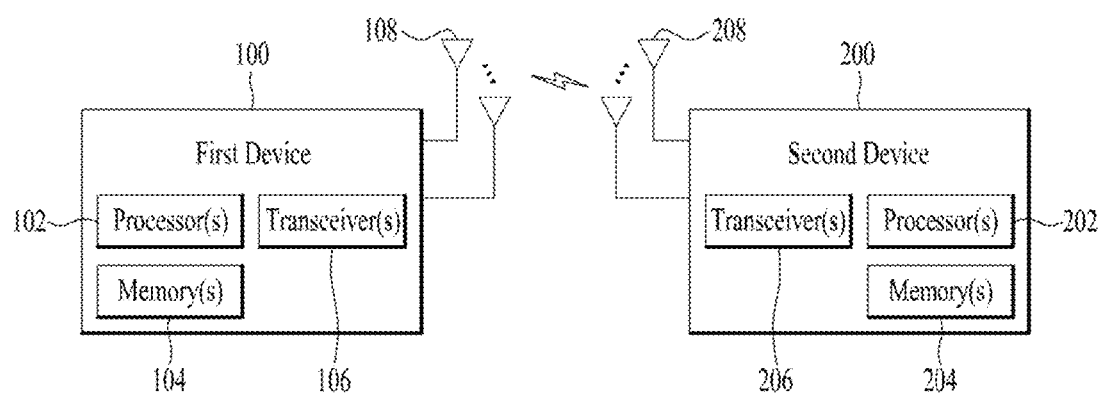
FIG. 2 is a block diagram illustrating examples of communication devices which can perform a method according to the present disclosure.

FIG. 2 is a block diagram illustrating examples of communication devices which can perform a method according to the present disclosure.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to {the wireless device 100a to 100f and the BS 200} and/or {the wireless device 100a to 100f and the wireless device 100a to 100f} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the functions, procedures, and/or methods described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the procedures and/or methods described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the functions, procedures, and/or methods described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the procedures and/or methods described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in the present disclosure may be implemented using firmware or software and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the present disclosure, at least one memory (e.g. 104 or 204) may store instructions or programs that, when executed, cause at least one processor, which is operably connected thereto, to perform operations according to some embodiments or implementations of the present disclosure.

In the present disclosure, a computer readable storage medium may store at least one instruction or computer program that, when executed by at least one processor, causes the at least one processor to perform operations according to some embodiments or implementations of the present disclosure.

In the present disclosure, a processing device or apparatus may comprise at least one processor, and at least one computer memory connectable to the at least one processor and storing instructions that, when executed, cause the at least one processor to perform operations according to some embodiments or implementations of the present disclosure.

In some implementations of the present disclosure, a UE may operate as a transmitting device in uplink (UL) and as a receiving device in downlink (DL). In some implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS, unless otherwise mentioned or described. For example, the processor(s) 102 connected to, mounted on or launched in the first wireless device 100 may be configured to perform the UE behaviour according to an implementation of the present disclosure or control the transceiver(s) 106 to perform the UE behaviour according to an implementation of the present disclosure. The processor(s) 202 connected to, mounted on or launched in the second wireless device 200 may be configured to perform the BS behaviour according to an implementation of the present disclosure or control the transceiver(s) 206 to perform the BS behaviour according to an implementation of the present disclosure.

Figure 3:
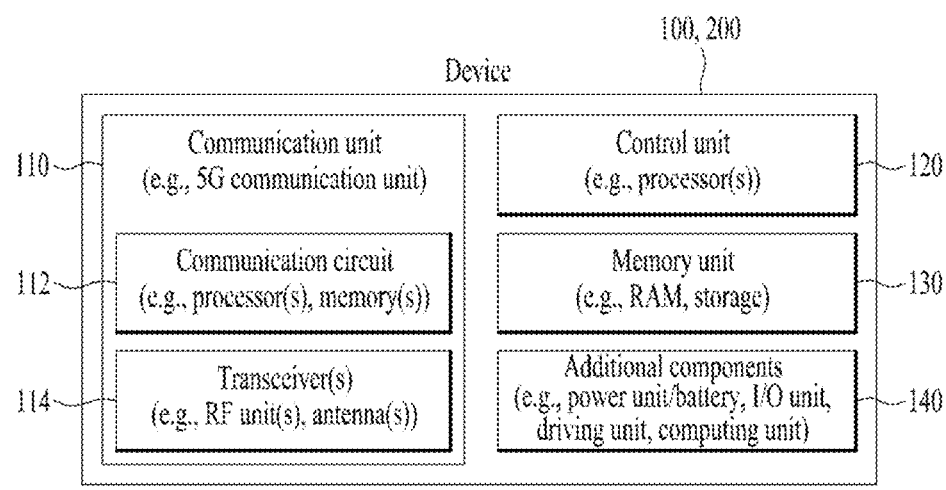
FIG. 3 illustrates another example of a wireless device which can perform implementations of the present invention.

FIG. 3 illustrates another example of a wireless device which can perform implementations of the present invention. The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit (e.g. audio I/O port, video I/O port), a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a Fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

FIG. 4 illustrates an example of protocol stacks in a 3GPP based wireless communication system.

In particular, FIG. 4(*a*) illustrates an example of a radio interface user plane protocol stack between a UE and a base station (BS) and FIG. 4(*b*) illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4(*a*), the user plane protocol stack may be divided into a first layer (Layer 1) (i.e., a physical (PHY) layer) and a second layer (Layer 2). Referring to FIG. 4(*b*), the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

The NAS control protocol is terminated in an access management function (AMF) on the network side, and performs functions such as authentication, mobility management, security control and etc.

In the 3GPP LTE system, the layer 2 is split into the following sublayers: medium access control (MAC), radio link control (RLC), and packet data convergence protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network quality of service (QoS) flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G core (5GC) or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

The RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

Figure 5:
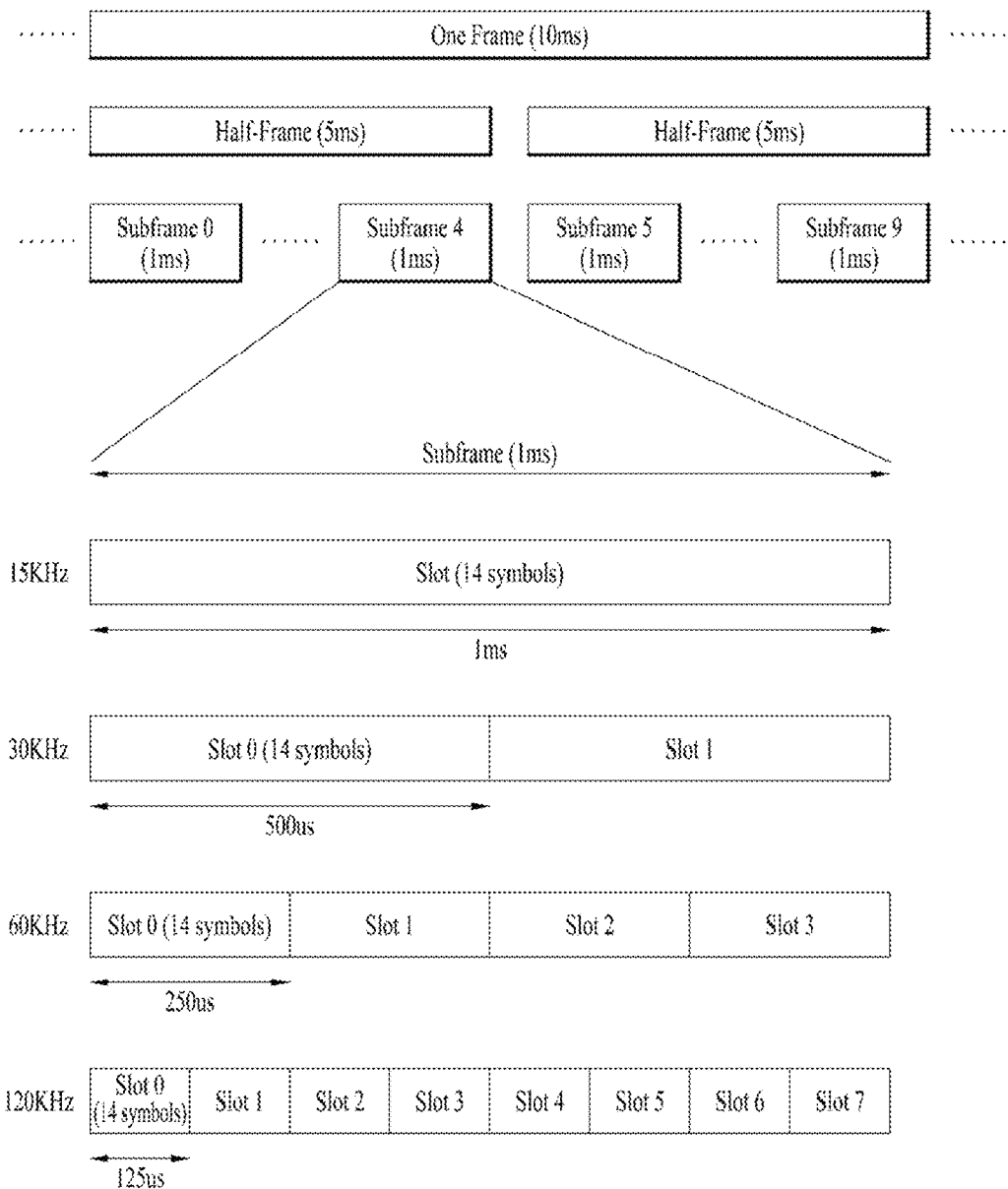
FIG. 5 illustrates an example of a frame structure in a 3GPP based wireless communication system.

FIG. 5 illustrates an example of a frame structure in a 3GPP based wireless communication system.

The frame structure illustrated in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz. The following table shows the number of OFDM symbols per slot, the number of slots per frame, and the number of slots per for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks in the resource grid and the subscript x is DL for downlink and UL for uplink. $N^{RB}_{sc}$ is the number of subcarriers per resource blocks. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, a resource block is defined by 12 consecutive subcarriers in the frequency domain.

In the 3GPP NR system, resource blocks are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB} N^{size}_{BWP,i}$, where $N^{size}_{BWP,i}$ is the common resource block where bandwidth part starts relative to CRB 0. The BWP includes a plurality of consecutive resource blocks. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

NR frequency bands are defined as 2 types of frequency range, FR1 and FR2. FR2 is may be also called millimeter wave (mmW). The frequency ranges in which NR can operate are identified as described in Table 3.

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 6:
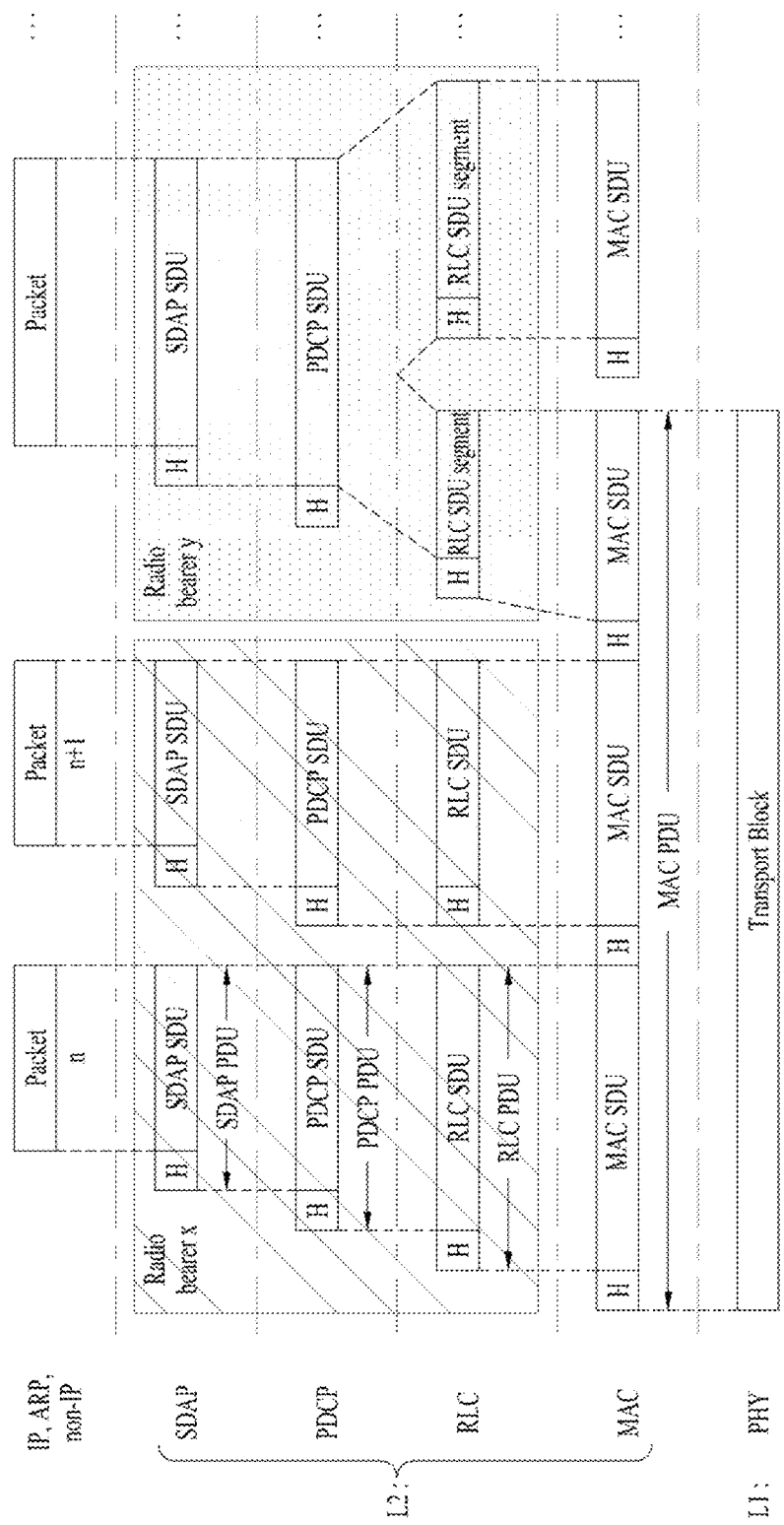
FIG. 6 illustrates a data flow example in the 3GPP based wireless communication system.

FIG. 6 illustrates a data flow example in the 3GPP based wireless communication system (e.g., NR system).

In FIG. 6, "RB" denotes a radio bearer, and "H" denotes a header. Radio bearers are categorized into two groups: data radio bearers (DRB) for user plane data and signaling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to physical uplink shared channel (PUSCH) and physical random access channel (PRACH), respectively, and the downlink transport channels DL-SCH, BCH and PCH are mapped to physical downlink shared channel (PDSCH), physical broad cast channel (PBCH) and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

For UCI transmission/reception, the following PUCCH formats may be used.

TABLE 4

| PUCCH format | Length in OFDM symbols | Number of UCI bits |
|---|---|---|
| 0 | 1-2 | =<2 |
| 1 | 4-14 | =<2 |
| 2 | 1-2 | >2 |
| 3 | 4-14 | >2 |
| 4 | 4-14 | >2 |

PUCCH format 0 is a short PUCCH of 1 or 2 symbols with small UCI payloads of up to two bits. PUCCH format 1 is a long PUCCH of 4 to 14 symbols with small UCI payloads of up to 2 bits. PUCCH format 2 is a short PUCCH of 1 or 2 symbols with large UCI payloads of more than two bits with no UE multiplexing capability in the same PRBs. PUCCH format 3 is a long PUCCH of 4 to 14 symbols with large UCI payloads with no UE multiplexing capability in the same PRBs. PUCCH format 4 is a long PUCCH of 4 to 14 symbols with moderate UCI payloads with multiplexing capacity of up to 4 UEs in the same PRBs. For each PUCCH format, resource location is configured by RRC signalling. For example, IE PUCCH-Config is used to configure UE specific PUCCH parameters (per BWP).

An operation to be first performed by the UE to receive services in association with a wireless communication system includes acquiring time and frequency synchronization of the corresponding system, receiving basic system information (SI), and synchronizing uplink timing to an uplink. This procedure will be referred to as an initial access procedure. The initial access procedure generally includes a synchronization procedure and a random access procedure. In a 3GPP based communication system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from a BS to thus establish synchronization with the eNB and acquire information such as a cell identity (ID).

For example, the UE acquires OFDM symbol timing and slot timing based on PSS and SSS and also acquires cell ID, and acquires important information in the corresponding system by descrambling and decoding a PBCH using a cell ID. After completing the synchronization procedure, the UE performs a random access procedure. In other words, after the initial cell search procedure, the UE may perform a random access procedure to complete access to the BS. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

The random access procedure is classified into a contention-based procedure and a dedicated (that is, contention-free based) procedure. The contention-based random access (CBRA) procedure is generally used for initial access, and the contention-free random access (CFRA) procedure is restrictively used for handover. In the CBRA procedure, the UE randomly selects RACH preamble sequence. Therefore, a plurality of UEs may transmit the same random access preamble sequence, whereby a contention resolution procedure is required. On the other hand, in the CFRA procedure, the UE uses a random access preamble sequence uniquely allocated to a corresponding UE. Therefore, the UE may perform the random access procedure without contention with another UE.

Figure 7:
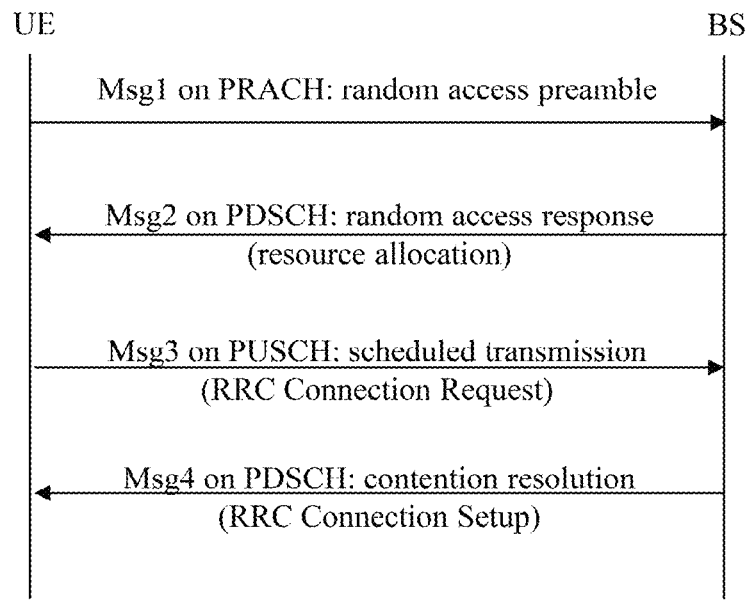
FIG. 7 and FIG. 8 illustrate examples of random access procedures in the 3GPP based system.
Figure 8:
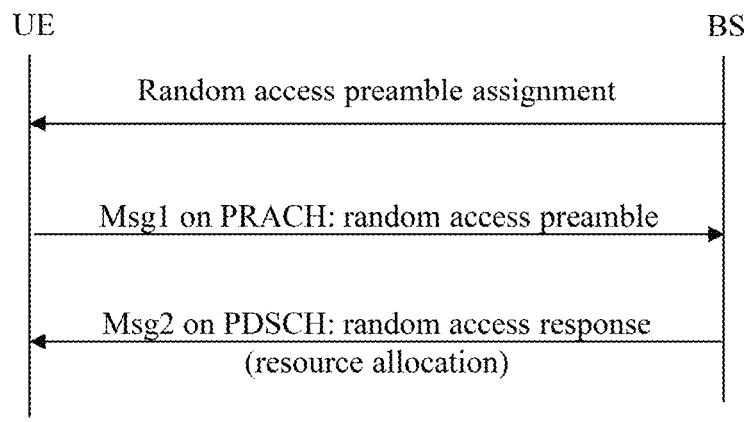

FIG. 7 and FIG. 8 illustrate examples of random access procedures in the 3GPP based system. In particular, FIG. 7 illustrates an example of a flow diagram of the CBRA procedure in the 3GPP based system, and FIG. 8 illustrates an example of a flow diagram of the CFRA procedure in the 3GPP based system.

Referring to FIG. 7, the CBRA procedure includes four steps as follows. Hereinafter, messages transmitted in the steps 1 to 4 may be referred to as 1 to 4 (Msg1 to Msg4):

Step 1: random access preamble (via PRACH) (UE to BS);
  Step 2: random access response (RAR) (via PDCCH and PDSCH) (BS to UE);
  Step 3: layer 2/layer 3 message (via PUSCH) (UE to BS);
  Step 4: contention resolution message (BS to UE).

In particular, Msg3 may denote a message transmitted on UL-SCH containing a C-RNTI MAC CE or CCCH SDU, submitted from upper layer above a MAC entity and associated with the UE Contention Resolution Identity, as part of a random access procedure.

Referring to FIG. 8, the CFRA procedure includes three steps as follows. Hereinafter, messages transmitted in steps 0 to 2 may be referred to as messages 0 to 2 (Msg0 to Msg2). As a part of the random access procedure, uplink transmission (that is, step 3) corresponding to RAR may be performed. The dedicated random access procedure may be triggered using a PDCCH (hereinafter, PDCCH order) for commanding random access preamble transmission:

Step 0: RACH preamble allocation (BS to UE) through dedicated signaling;
  Step 1: RACH preamble (via PRACH) (UE to BS); and
  Step 2: random access response (RAR) (via PDCCH and PDSCH) (BS to UE).

After transmitting the RACH preamble, the UE attempts to receive a random access response (RAR) within a preset time window. Specifically, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RA-RNTI associated with the PRACH occasion in which the Random Access Preamble is transmitted, is computed as:

$$RA\text{-}RNTI = 1 + s\_id + 14 * t\_id + 14 * 80 * f\_id + 14 * 80 * 8 * ul\_carrier\_id$$

where s_id is the index of the first OFDM symbol of the PRACH occasion (0<=s_id<14), t_id is the index of the first slot of the PRACH occasion in a system frame (0<=t_id<80), fid is the index of the PRACH occasion in the frequency domain (0<=f_id<8), and ul_carrier_id is the UL carrier used for Random Access Preamble transmission (0 for normal uplink (NUL) carrier, and 1 for supplementary uplink (SUL) carrier).

The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information corresponding to Msg3.

For example, once the random access preamble is transmitted, the MAC entity of the UE:

1> else if a downlink assignment has been received on the PDCCH for the RA-RNTI and the received TB is successfully decoded:
2>> if the Random Access Response contains a MAC subPDU with Backoff Indicator:
3>>> sets the PREAMBLE_BACKOFF to a value of the BI field of the MAC subPDU based on predefined backoff parameter values, multiplied with SCALING_FACTOR_BI, where SCALING_FACTOR_BI is a UE variable for the random access procedure
2>> else:
3>>> sets the PREAMBLE_BACKOFF to 0 ms.
2>> if the Random Access Response contains a MAC subPDU with Random Access Preamble identifier corresponding to the transmitted PREAMBLE_INDEX (e.g. RAPID of the transmitted random access preamble):
3>>> considers this Random Access Response reception successful.
2>> if the Random Access Response reception is considered successful:
3>>> if the Random Access Response includes a MAC subPDU with RAPID only:
4>>>> considers this Random Access procedure successfully completed;
4>>>> indicates the reception of an acknowledgement for system information (SI) request to upper layers.
3>>> else:
4>>>> applies the following actions for the Serving Cell where the Random Access Preamble was transmitted:
5>>>>> processes the received Timing Advance Command;
5>>>>> indicates the preambleReceivedTargetPower and the amount of power ramping applied to the latest Random Access Preamble transmission to lower layers (i.e. (PREAMBLE_POWER_RAMPING_COUNTER−1)*PREAMBLE_POWER_RAMPING_STEP);
5>>>>> if the Serving Cell for the Random Access procedure is sounding reference signal only SCell (SRS-only SCell):
6>>>>>> ignores the received UL grant.
5>>>>> else:
6>>>>>> processes the received UL grant value and indicates it to the lower layers.
4>>>> if the Random Access Preamble was not selected by the MAC entity among the contention-based Random Access Preamble(s):
5>>>>> considers the Random Access procedure successfully completed.
4>>>> else:
5>>>>> sets the TEMPORARY C-RNTI to the value received in the Random Access Response;
5>>>>> if this is the first successfully received Random Access Response within this Random Access procedure:
6>>>>>> if the transmission is not being made for the CCCH logical channel:
7>>>>>>> indicates to the Multiplexing and assembly entity to include a C-RNTI MAC CE in the subsequent uplink transmission.
6>>>>>> obtains the MAC PDU to transmit from the Multiplexing and assembly entity and stores it in the Msg3 buffer.

Once Msg3 is transmitted, the MAC entity of the UE may:
1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
2>> if the C-RNTI MAC CE was included in Msg3:
3>>> if the Random Access procedure was initiated for beam failure recovery and the PDCCH transmission is addressed to the C-RNTI; or
3>>> if the Random Access procedure was initiated by a PDCCH order and the PDCCH transmission is addressed to the C-RNTI; or
3>>> if the Random Access procedure was initiated by the MAC sublayer itself or by the RRC sublayer and the PDCCH transmission is addressed to the C-RNTI and contains a UL grant for a new transmission:
4>>>> consider this Contention Resolution successful;
4>>>> stop ra-ContentionResolutionTimer;
4>>>> discard the TEMPORARY C-RNTI;
4>>>> consider this Random Access procedure successfully completed.
2>> else if the CCCH SDU was included in Msg3 and the PDCCH transmission is addressed to its TEMPORARY C-RNTI:
3>>> if the MAC PDU is successfully decoded:
4>>>> stop ra-ContentionResolutionTimer;
4>>>> if the MAC PDU contains a UE Contention Resolution Identity MAC CE; and 4>>>> if the UE Contention Resolution Identity in the MAC CE matches the CCCH SDU transmitted in Msg3:
5>>>>> consider this Contention Resolution successful and finish the disassembly and demultiplexing of the MAC PDU;
5>>>>> if this Random Access procedure was initiated for SI request:
6>>>>>> indicate the reception of an acknowledgement for SI request to upper layers.
5>>>>> else:
6>>>>>> set the C-RNTI to the value of the TEMPORARY C-RNTI;
5>>>>> discard the TEMPORARY C-RNTI;
5>>>>> consider this Random Access procedure successfully completed.
4>>>> else:
5>>>>> discard the TEMPORARY C-RNTI;
5>>>>> consider this Contention Resolution not successful and discard the successfully decoded MAC PDU.

Figure 9:
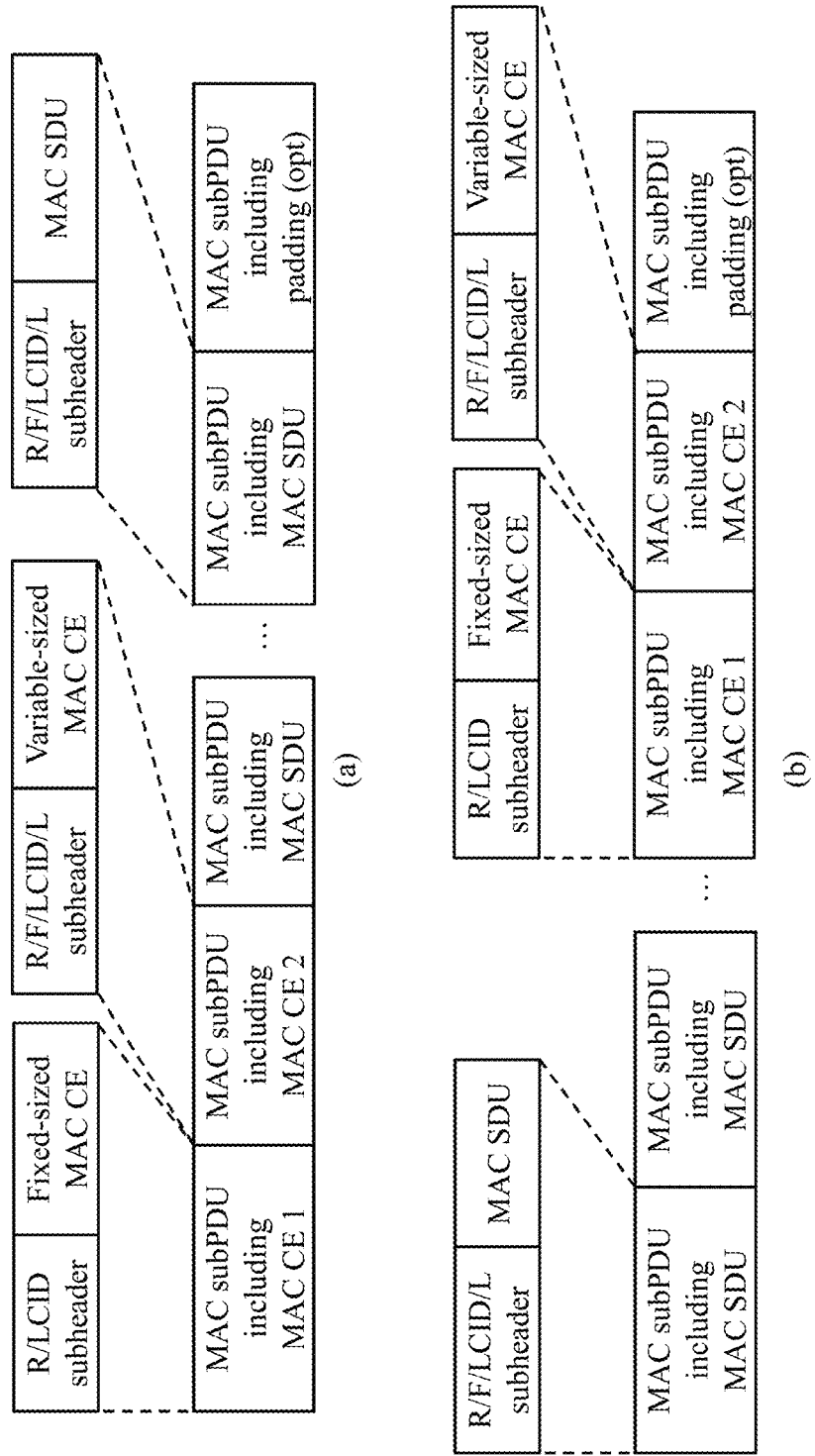
FIG. 9 illustrates examples of medium access control (MAC) protocol data unit (PDU) for some implementations of the present disclosure.

FIG. 9 illustrates examples of MAC PDU for some implementations of the present disclosure. In particular, FIG. 9(a) illustrates an example of a DL MAC PDU, and FIG. 9(b) illustrates an example of a UL MAC PDU except for transparent MAC and random access response (RAR).

A MAC PDU for DL-SCH and UL-SCH except transparent MAC and RAR may consist of one or more MAC subPDUs. Each MAC subPDU consists of one of the following:
A MAC subheader only (including padding);
A MAC subheader and a MAC SDU;
A MAC subheader and a MAC CE;
A MAC subheader and padding.

The MAC SDUs may be of variable sizes. Each MAC subheader corresponds to either a MAC SDU, a MAC CE, or padding.

A UL MAC PDU shown in FIG. 9(a) may be used for transmission of the Msg3, and a DL MAC PDU shown in FIG. 9(b) may be used for transmission of the Msg4.

A Msg4 of the 4-step RACH shown in FIG. 7 may include a UE Contention Resolution Identity MAC CE.

FIG. 10 illustrates an example of a UE contention resolution identity MAC CE for some implementations of the present disclosure.

In some implementations of the present disclosure, the UE Contention Resolution Identity (CRID) MAC CE may be identified by MAC PDU subheader with LCID (e.g., as specified in Table 5). The UE CRID MAC CE may have a fixed 48-bit size. In some scenarios, the UE Contention Resolution Identity MAC CE may consist of a single UE Contention Resolution Identity field. The UE Contention Resolution Identity field may contain the UL CCCH SDU transmitted in the Msg3.

A MAC subheader except for fixed sized MAC CE, padding, and a MAC SDU containing UL CCCH consists of the four header fields R/F/LCID/L. A MAC subheader for fixed sized MAC CE, padding, and a MAC SDU containing UL CCCH consists of the two header fields R/LCID. Referring to FIG. 9(a) and FIG. 9(b), MAC CEs may be placed together. For a DL MAC PDU, DL MAC subPDU(s) with MAC CE(s) may be placed before any MAC subPDU with MAC SDU and MAC subPDU with padding, as shown in FIG. 9(a). For a UL MAC PDU, UL MAC subPDU(s) with MAC CE(s) may be placed after all the MAC subPDU(s) with MAC SDU and before the MAC subPDU with padding, as shown in FIG. 9(b). The size of padding can be zero.

FIG. 11 illustrates examples of MAC subheader used in a MAC PDU for DL-SCH and UL-SCH. In particular, FIG. 11(a) illustrates an example of R/F/LCID/L MAC subheader with 8-bit L field, FIG. 11(b) illustrates an example of R/F/LCID/L MAC subheader with 16-bit L field, and FIG. 11(c) illustrates an example of R/LCID MAC subheader.

The MAC subheader for DL-SCH and UL-SCH may consist of the logical channel ID (LCID) field, the length (L) field, the format (F) field, and the reserved (R) bit set to "0". The LCID field identifies the logical channel instance of the corresponding MAC SDU or the type of the corresponding MAC CE or padding. There is one LCID field per MAC subheader. The following table shows examples of values of LCID for DL-SCH.

TABLE 5

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

The following table shows examples of values of LCID for UL-SCH.

TABLE 6

| Index | LCID values |
|---|---|
| 0 | CCCH of size 64 bits (referred to as "CCCH1" in 3GPP TS 38.331) |
| 1-32 | Identity of the logical channel |
| 33-51 | Reserved |
| 52 | CCCH of size 48 bits (referred to as "CCCH" in 3GPP TS 38.331) |
| 53 | Recommended bit rate query |
| 54 | Multiple Entry PHR (four octet $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

Figure 12:
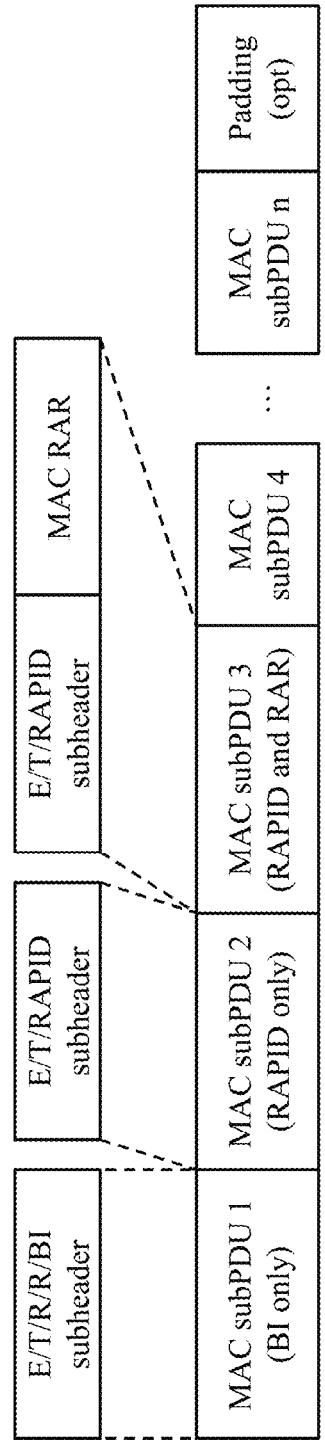
FIG. 12 illustrates an example of a MAC PDU for random access response (RAR)

FIG. 12 illustrates an example of a MAC PDU for RAR.

Referring to FIG. 12, a MAC PDU for RAR (RAR MAC PDU) may consist of one or more MAC subPDUs and optionally padding. In some scenarios, each MAC subPDU may consist one of the following:
a MAC subheader with Backoff Indicator only;
a MAC subheader with RAPID only (i.e. acknowledgment for SI request);
a MAC subheader with RAPID and MAC RAR.

Padding is placed at the end of the MAC PDU if present. Presence and length of padding is implicit based on transport block (TB) size, size of MAC subPDU(s).

FIG. 13 illustrates examples of MAC subheader related to RAR.

In some scenarios, a MAC subheader with Backoff Indicator may consist of five header fields E/T/R/R/BI as shown in FIG. 13(a). A MAC subPDU with Backoff Indicator only is placed at the beginning of the MAC PDU, if included. 'MAC subPDU(s) with RAPID only' and 'MAC subPDU(s) with RAPID and MAC RAR' can be placed anywhere between MAC subPDU with Backoff Indicator only (if any) and padding (if any). A MAC subheader with RAPID may consist of three header fields E/T/RAPID as shown in FIG. 13(b). Padding is placed at the end of the MAC PDU if present. Presence and length of padding is implicit based on transport block (TB) size, size of MAC subPDU(s).

The MAC subheader for RAR may consist of the extension field (E) field, the type (T) field, reserved bit (R), the backoff indicator (BI) field; and/or the random access preamble identifier (RAPID) field. The E field in the MAC subheader is a flag indicating if the MAC subPDU including this MAC subheader is the last MAC subPDU or not in the RAR MAC PDU. Alternatively, the E field is a flag indicating if this MAC subheader is the last MAC subheader or not in the RAR MAC PDU. The T field in the MAC subheader is a flag indicating whether the MAC subheader contains an RAPID or a BI. For example, the T field is set to "0" to indicate the presence of a BI field in the MAC subheader, and the T field is set to "1" to indicate the presence of a RAPID field in the MAC subheader. The reserved bit (R) is set to "0". The BI field identified the overload condition in the cell. The size of the BI field is 4 bits. The RAPID field identifies the transmitted RAP. If the RAPID in the MAC subheader of a MAC subPDU corresponds to one of the RAPs configured for SI request, MAC RAR is not included in the MAC subPDU.

FIG. 14 illustrates an example of a part of a MAC PDU for RAR in some implementations of the present disclosure.

A MAC PDU for RAR may include i) a MAC subheader including a random access preamble ID (RAPID) and ii) a MAC payload for RAR.

Referring to FIG. 14, the MAC RAR may consist of a reserved bit (R), the timing advance command (TA) field, the UL grant field, and the TC-RNTI field. The reserved bit (R) is set to 0. The TA field indicates the index value $T_A$ used to control the amount of timing adjustment that the MAC entity has to apply. The size of the TA field may be 12 bits. The UL grant field indicates the resources to be used on the uplink. The size of the UL grant field may be 27 bits. The TC-RNTI field indicates the temporary identify that is used by the MAC entity during random access. The size of the TC-RNTI field may be 16 bits.

The random access procedure illustrated in FIG. 7 and FIG. 8 involves at least four or three steps of signal transmissions/receptions between the BS and the UE before the random access procedure is completed successfully. It results in communication delay between the BS and the UE. Recently, 2-step random access procedure (hereinafter, 2-step RACH) is under discussion in order to reduce the communication delay. For the 2-step RACH, the messages in time order are named as Msg A and MsgB.

In some implementations of the present disclosure, the 2-step RACH may be designed based on the following assumption(s):
  Only CBRA procedure is specified for the 2-step RACH;
  The 2-step RACH shall be able to operate regardless of whether the UE has valid timing advance (TA) or not;
  The 2-step RACH is applicable to any cell size supported in the wireless communication system;
  The 2-step RACH is applied for RRC_INACTIVE, RRC_CONNECTED and RRC_IDLE;
  Channel structure of MsgA is i) preamble and ii) PUSCH carrying payload.
  The mapping between i) the PRACH preamble and ii) the time-frequency resource of PUSCH in MsgA (and DMRS);
  All triggers for the 4-step RACH (e.g. see the document 3GPP TS 38.321 V15.3.0, at section 5.4.4 'Scheduling Request', section 5.15 'Bandwidth Part (BWP) operation' and section 5.17 'Beam Failure Detection and Recovery procedure') may be applied for the 2-step RACH except for system information (SI); and/or
  The fallback procedure from the 2-step RACH to the 4-step RACH may be designed.

Based on the above assumption(s), in some implementations of the present, the following 2-step RACH procedures may be considered.

Figure 15:
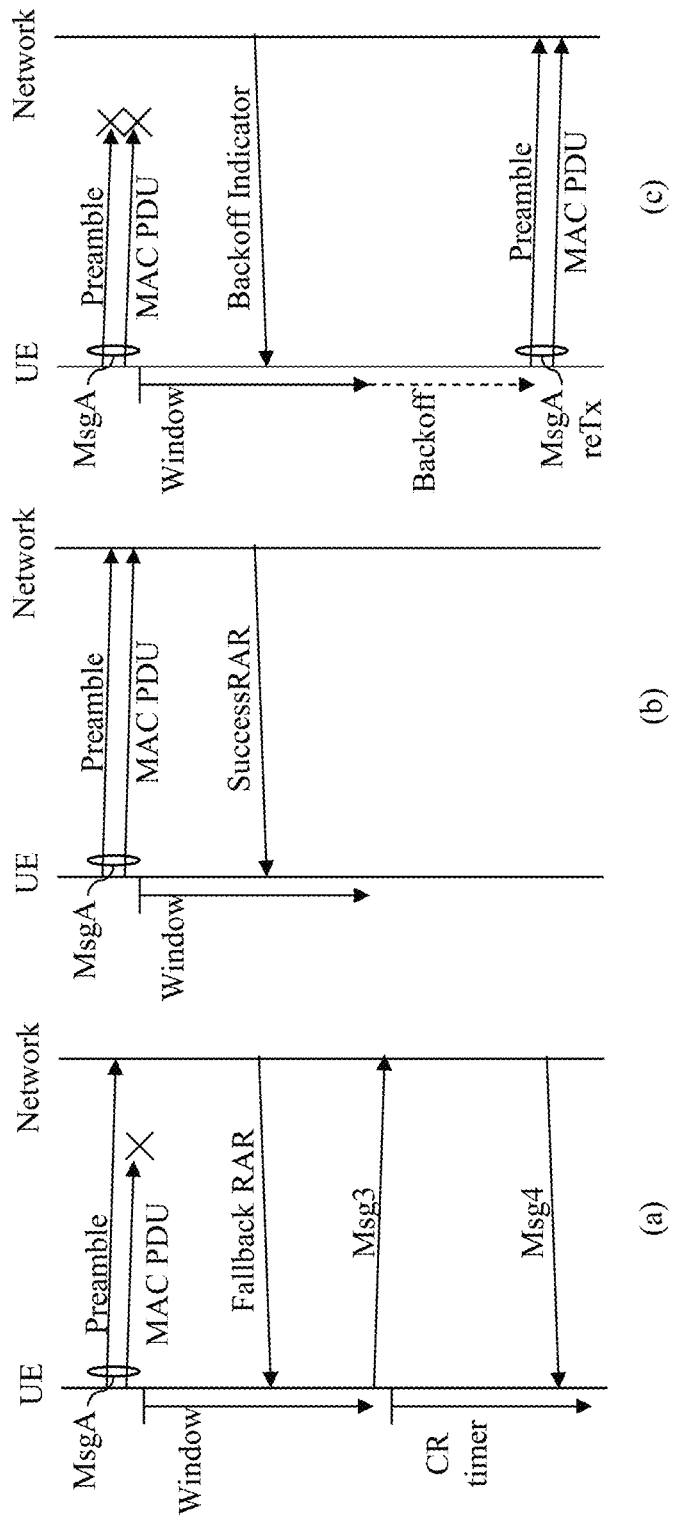
FIG. 15 illustrates examples of flow diagrams of the 2-step RACH procedure in some implementations of the present disclosure.

FIG. 15 illustrates examples of flow diagrams of the 2-step RACH procedure in some implementations of the present disclosure. In particular, FIG. 15(a) illustrates an example of a successfully completed 2-step RACH involving a fallback to the 4-step RACH, FIG. 15(b) illustrates an example of a successfully completed 2-step RACH without a fallback to the 4-step RACH, and FIG. 15(c) illustrates an example of a failed 2-step RACH.

The UE transmits simultaneously or sequentially a preamble and a PUSCH carrying payload. The UE monitors PDCCH addressed to RNTI for MsgB (e.g. random access RNTI (RA-RNTI), or C-RNTI, or new RNTI for MsgB) during an MsgB window (or RAR window). Hereinafter, a window during which a UE having transmitted MsgA monitors PDCCH addressed to RNTI for MsgB is referred to as an MsgB response window. The parameter for the Msg response window may be provided to the UE by the BS via RRC signaling.

Referring to FIG. 15(a), if the UE receives a RAR message with the transmitted preamble ID while the MsgB response window is running, the UE may fall back to the 4-step RACH procedure. The RAR message for fallback may contain at least timing advance (TA) command, temporary cell RNTI (TC-RNTI) and/or UL grant (e.g., as shown in FIG. 14). After receiving the RAR MAC including the RAPID of the transmitted preamble, the UE may follow the conventional 4-step RACH procedure.

Referring to FIG. 15(b), however, if the UE receives a RAR message with the UE ID (e.g., UE contention resolution identity (CRID)) or cell RNTI (C-RNTI) transmitted in the MsgA, while the MsgB response window is running, the UE may consider this contention resolution successful. The success RAR may contain a UE ID (e.g., CRID or C-RNTI) which was transmitted in MsgA, TA command, and C-RNTI. Alternatively, the success RAR may be addressed to C-RNTI which was transmitted in MsgA, and contain a TA command.

Referring to FIG. 15(b), if the UE receives neither the success RAR related to the transmitted UE ID nor the fallback RAR for the transmitted RAP until the MsgB response window expires, the UE may consider this contention resolution not successful. If the UE has received a RAR including a Backoff (BO) Indicator, the UE may select a random backoff according to a uniform distribution between 0 and the BO indicator (BI) and performs the RA retry after the BO time.

If the fallback RAR, Success RAR and BO indicator can be multiplexed in a MAC PDU for different UEs addressed to the same RNTI, it is needed to define a method for differentiating the success RAR from the fallback RAR or BO indicator. In the RAR MAC PDU format explained in FIG. 12 to FIG. 13, the RAR payload and the BO indicator may be differentiated from each other by 1-bit Type field in the sub-header, but the success RAR may not be differentiated from the fallback RAR or BO indicator. In the 2-step RACH procedure, the fallback RAR may reuse the RAR format shown in FIG. 14 that includes a RAPID subheader and a RAR payload, and the BI may also reuse the BO subheader. However, if the success RAR could be multiplexed in a MAC PDU including the fallback RAR and BO indicator, then a method to distinguish the success RAR from the fallback RAR or BO indicator should be defined.

In some implementations of the present disclosure, a new Type field (i.e., new indicator) may be used to indicate/represent whether there is a Backoff Indicator or success RAR. In the present disclosure, the new Type field is referred to as "T2", "T2 field", or "second Type field". In some implementations of the present disclosure, in addition to the introducing the new Type field, the T field described in FIG. 13 may be redefined to indicate/represent whether the MAC subheader contains a RAPID or others (e.g. BO indicator or UE CRID). Hereinafter, the T field used to indicate whether a MAC subheader including the T field contains a RAPID or others is referred to as "T1", "T1 field", or "first Type field".

Figure 16:
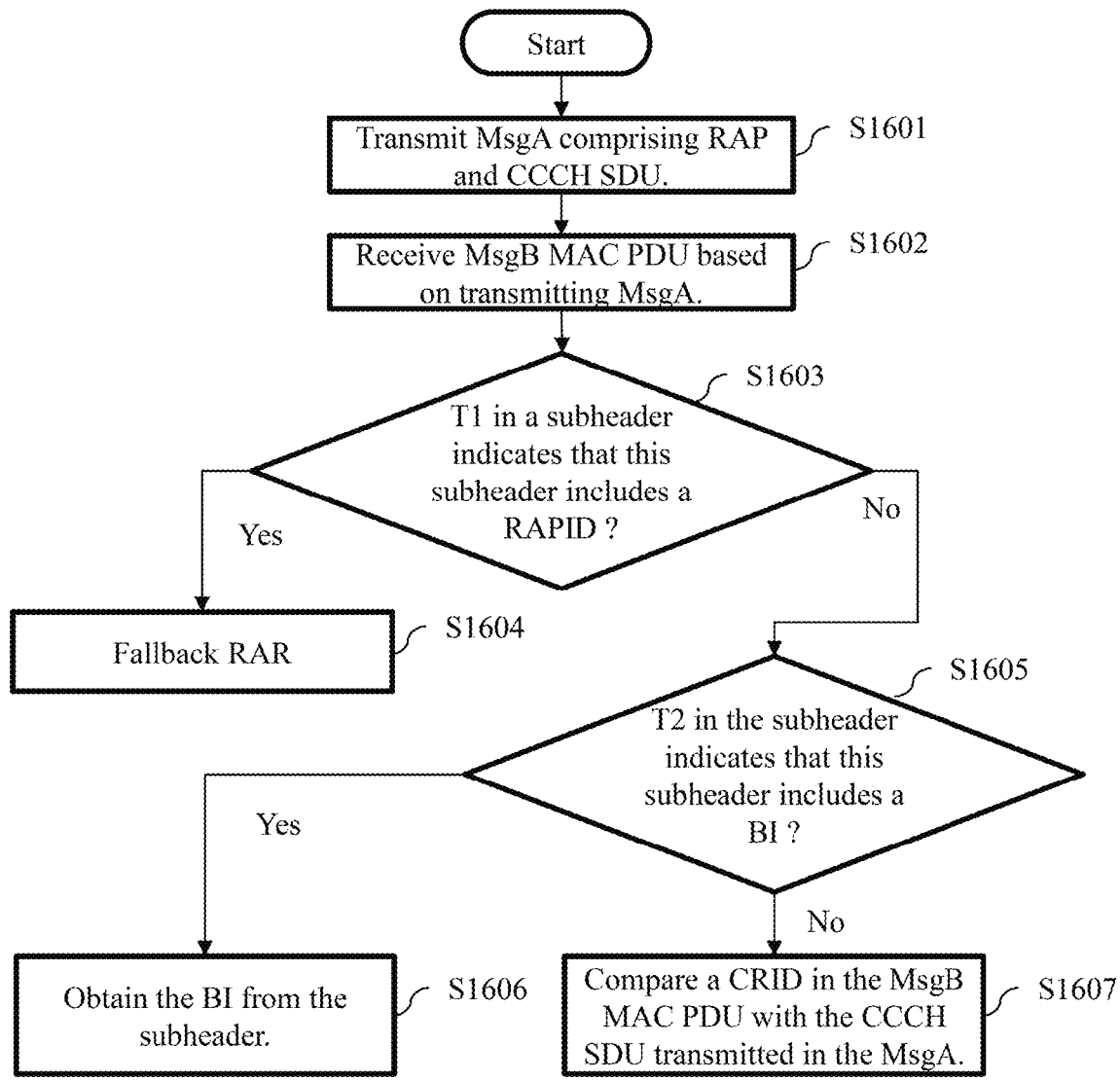
FIG. 16 illustrates an example of a flow diagram of a 2-step RACH procedure according to some implementations of the present disclosure.

FIG. 16 illustrates an example of a flow diagram of a 2-step RACH procedure according to some implementations of the present disclosure.

A UE may perform a 2-step RACH procedure. For the 2-step RACH procedure, the UE may transmit a MsgA (S1601). Transmitting the MsgA may comprise transmitting i) a random access preamble (RAP) on a PRACH and ii) a CCCH SDU on a PUSCH. The UE may receive a MsgB MAC PDU in response to transmitting the MsgA (S1602). For example, after transmitting the MsgA, the UE monitors a PDCCH based on an RNTI for MsgB. If the UE detects a PDCCH addressed to the RNTI for MsgB, the UE can receive or obtain a MsgB MAC PDU based on DCI included in the PDCCH.

Figure 17:
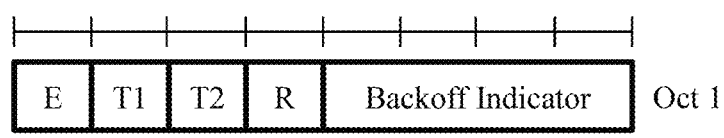
FIG. 17 and FIG. 18 illustrate examples of a part of a MAC PDU for MsgB.
Figure 18:
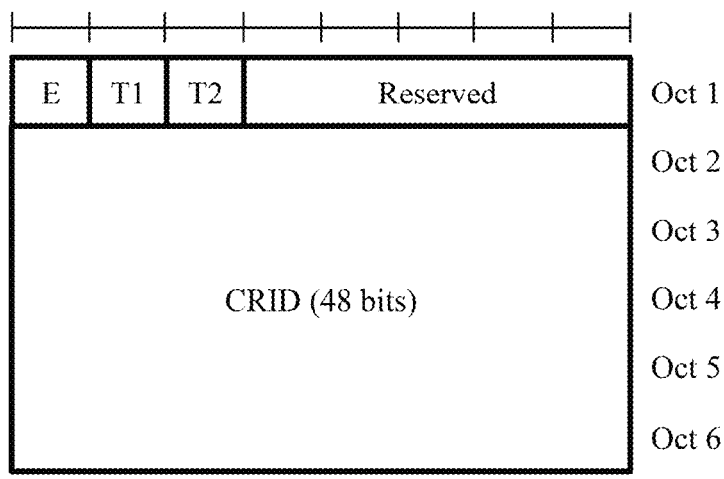

FIG. 17 and FIG. 18 illustrate examples of a part of a MAC PDU for MsgB. In particular, FIG. 17 illustrates an example of a backoff indicator subheader with a new indicator (T2) according to some implementations of the present disclose, and FIG. 18 illustrates an example of a part of a MsgB MAC PDU including a contention resolution identity (CRID) field according to some implementations of the present disclosure.

Referring to FIG. 17, in some implementations of the present disclosure, T2 may be additionally included in a subheader if T1 indicates that this subheader does not contain a RAPID.

In the example of FIG. 16, if T1 in a subheader in included in the MsgB MAC PDU indicates that this subheader contains a RAPID (S1603, Yes), the UE may determine that the MsgB MAC PDU includes a fallback RAR and that the subheader is for fallback RAR (S1604). If the RAPID matches an ID of the RAP that the UE transmitted in the MsgA, the UE may fall back to a 4-step RACH procedure.

If the RAPID matches an ID of the RAP that the UE transmitted in the MsgA, the UE may process the fallback RAR. In some implementations of the present disclosure, the fallback RAR may contain the RAR payload shown in FIG. 14. The UE may transmit Msg3 of the 4-step RACH procedure based on a UL grant included in the fallback RAR.

In some implementations of the present disclosure, if T1 in a subheader included in the MsgB MAC PDU indicates that this subheader does not contain a RAPID (S1603, No), the UE may additionally check T2 in the subheader. If T2 in the subheader indicates that this subheader contains a BI (S1605, Yes), then the UE may receive (e.g. obtain or process) the BI value from this subheader (S1606). For example, if a MAC subheader in a MAC PDU received based on a PDCCH addressed to a RNTI for MsgB includes a T2 field set to a value representing the presence of a BI, then the MAC subheader includes the BI. The UE may select a random backoff time according to a uniform distribution 0 and a value indicated by the BI. The UE may perform a random access resource selection for the 2-step RACH after the backoff time.

In some implementations of the 4-step RACH procedure, a UE may determine that a subheader contains a BI if a T field in a subheader is set to a value "0", and determine that the subheader contains a RAPID if the T field in the subheader is set to a value "1". In other words, in the 4-step RACH procedure, if a T field in a subheader included in a RAR MAC PDU is set to a value representing that the subheader contains a RAPID, the UE may determine that the subheader includes a BI. In the 2-step RACH procedure according to some implementations of the present disclosure, the UE further check a T2 field in a subheader to determine whether the subheader contain a BI field.

Referring to FIG. 18, in some implementations of the present disclosure, T2 in a subheader indicates that this subheader does not contain a BI, then a part of a MsgB MAC PDU includes a CRID field. In some implementations of the present disclosure, a new CRID field or subheader which is indicated by or based on the T2 indicator may be defined. The CRID field/subheader contains at least UE Contention Resolution ID. A BS may transmit a MAC PDU including a CRID if the MsgA is successfully received at the BS from a UE. The CRID may comprise a CCCH SDU which was received at BS in the MsgA.

In the example of FIG. 16, if T2 in the subheader indicates that this subheader does not contain a BI (e.g., if T2 is set to a value representing or related to the presence of a CRID field) (S1606, No), then the UE may receive (e.g. obtain or process) a CRID value from the MsgB MAC PDU (S1607). For example, if T2 indicates or represents that the MAC PDU contains a CRID (e.g. in this subheader or payload associated with this subheader) (S1606, No), then the UE may compare the CRID with the CCCH SDU which was transmitted in the MsgA (S1607).

If a UE receives a MAC PDU including a CRID, the UE may compare the CRID with the CCCH SDU which was transmitted in the MsgA. If the CRID matches the CCCH SDU transmitted in the MsgA of the UE, then the UE may determine/consider that the MAC PDU includes a success RAR for the UE. The success RAR may contain i) the CRID which was transmitted in MsgA, ii) TA Command, and/or iii) C-RNTI.

In some implementations related to FIG. 13, a MAC PDU in response to transmission of RAP includes no MAC SDU. However, in some implementations of the present disclosure, a MAC PDU including a success RAR may be allowed to contain a MAC SDU. A MAC SDU carried in a MAC PDU including a success RAR for a UE may allow the BS to provide DL data for the UE fast. In the implementations in which a MAC SDU for a UE may be included in a MAC PDU containing a success RAR for the UE, the MAC PDU further includes a MAC SDU indicator. The MAC SDU indicator may represent or indicate whether the MAC PDU includes a MAC SDU related to a success RAR.

For a 2-step RACH procedure, a UE may transmit an MsgA. Transmitting the MsgA may comprise transmitting i) a random access preamble (RAP) on a PRACH and ii) a CCCH SDU on a PUSCH. The UE may receive a MsgB MAC PDU in response to transmitting the MsgA. For example, after transmitting the MsgA, the UE monitors a PDCCH based on an RNTI for MsgB. If the UE detects a PDCCH addressed to the RNTI for MsgB, the UE can receive or obtain a MsgB MAC PDU based on DCI included in the PDCCH.

In some implementations of the present disclosure, the MsgB MAC PDU may include a MAC SDU indicator regarding whether the MsgB MAC PDU includes a MAC SDU. If the MAC SDU indicator is set to a value indicating or representing that the MsgB MAC PDU includes a MAC SDU, the UE may obtain or process the MAC SDU from the MsgB MAC PDU. In some implementations of the present disclosure, if the MsgB MAC PDU includes a CRID matching the CCCH SDU that the UE transmitted in the MsgA and if the MAC SDU indicator related to the CRID is set to the value indicating or representing that the MsgB MAC PDU includes a MAC SDU, the UE may obtain or process the MAC SDU from the MsgB MAC PDU. If the MAC SDU indicator is set to a value indicating or representing that the MsgB MAC PDU does not include a MAC SDU, the UE does not have to attempt to obtain a MAC SDU from the MsgB MAC PDU.

For example, if a CRID in a MAC PDU for MsgB matches the CCCH SDU transmitted in the MsgA by the UE, then the UE may process the additional contents (e.g. success RAR payload) corresponding to the CRID. The success RAR payload may include at least one of Timing Advance Command, C-RNTI, and/or UL grant. The MAC SDU indicator may be further included in a MAC PDU. In some implementations, the MAC subheader may be included in a MAC subPDU including the success RAR payload. In some implementations, the MAC subheader may be included as a part of the success RAR payload in the MAC PDU. The MAC SDU indicator may represent or indicate whether this MAC PDU contains the MAC SDU corresponding to the success RAR. If the CRID matches the CCCH SDU of the UE and the MAC SDU indicator indicates that there is a MAC SDU for the success RAR, then the UE may additionally decodes the MAC SDU for the success RAR payload. If the CRID matches the CCCH SDU of the UE but the MAC SDU indicator indicates that there is no MAC SDU for the success RAR, the UE may stop decoding the remaining MAC PDU. In some implementations of the present disclosure, the success RAR payload and the CRID are included in a MAC subPDU. In some other implementations, the MAC PDU may include contents related to a success RAR (e.g., Timing Advance Command, C-RNTI, UL grant, and/or MAC SDU indicator) in a variety of ways.

Figure 19:
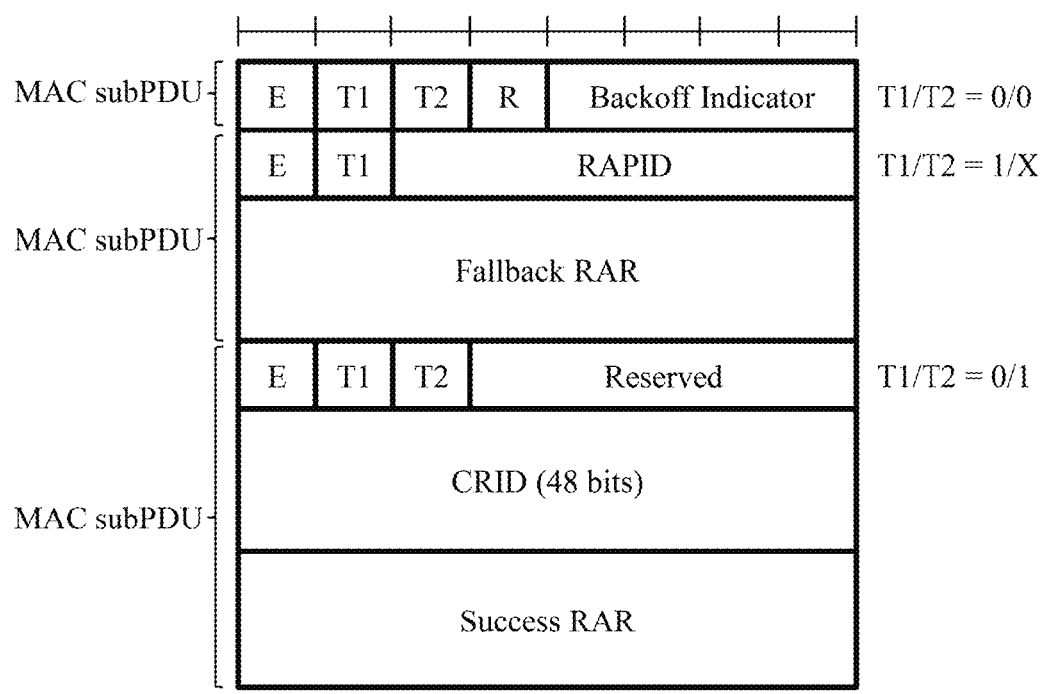
FIG. 19 illustrates an example of a RAR MAC PDU according to some implementations of the present disclosure.

FIG. 19 illustrates an example of a RAR MAC PDU according to some implementations of the present disclosure. In the example of FIG. 19, for multiple UEs, the RAR MAC PDU includes i) BO indicator, ii) fallback RAR and iii) success RAR.

Figure 20:
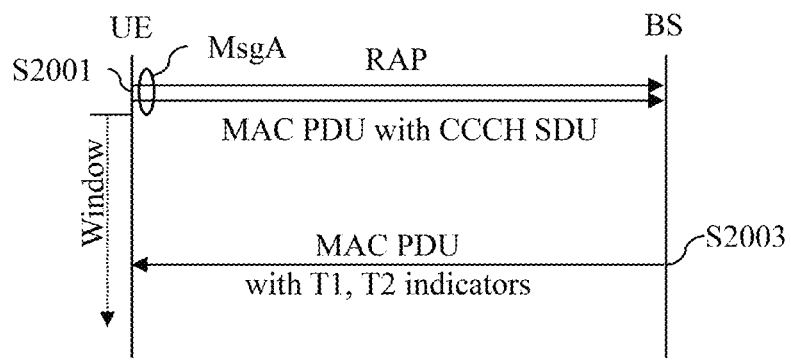
FIG. 20 illustrates an example of a 2-step RACH procedure according to some implementations of the present disclosure.

FIG. 20 illustrates an example of a 2-step RACH procedure according to some implementations of the present disclosure.

Figure 21:
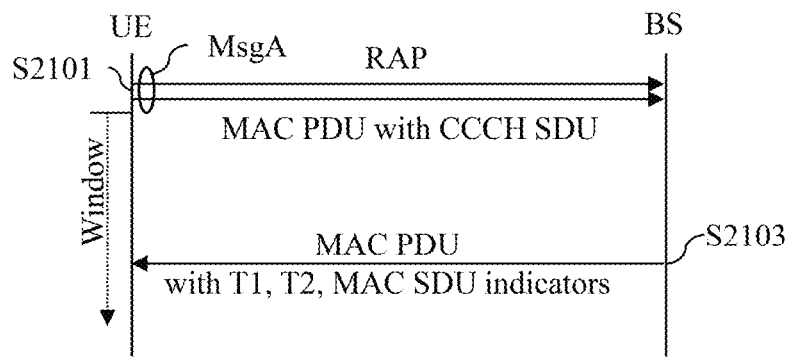
FIG. 21 illustrates another example of a 2-step RACH procedure according to some implementations of the present disclosure.

In some scenarios, a UE may trigger a 2-step RACH. Referring to FIG. 21, the UE transmits an MsgA which comprises i) an RAP and ii) a UL MAC PDU including a CCCH SDU (S2001). The UE may start a window for MsgB/RAR reception based on transmitting the MsgA. The UE monitors an MsgB/MAC PDU/RAR addressed to a RNTI for MsgB/RAR while the window is running. The UE may receive a DL MAC PDU based on the RNTI for MsgB/RAR while the window is running (S2003). In some implementations of the present disclosure, the DL MAC PDU may include a subheader including T1 and T2 indicators. Based on the T1 and T2 indicator, the UE may determine whether the DL MAC PDU includes a CRID associated with the subheader.

FIG. 21 illustrates another example of a 2-step RACH procedure according to some implementations of the present disclosure.

In some scenarios, a UE may trigger a 2-step RACH. Referring to FIG. 21, the UE transmits an MsgA which comprises i) an RAP and ii) a UL MAC PDU including a CCCH SDU (S2101). The UE may start a window for MsgB/RAR reception based on transmitting the MsgA. The UE monitors an MsgB/MAC PDU/RAR addressed to a RNTI for MsgB/RAR while the window is running. The UE may receive a DL MAC PDU based on the RNTI for MsgB/RAR while the window is running (S2103). In some implementations of the present disclosure, the DL MAC PDU may include T1, T2 and MAC SDU indicators. In some implementations of the present disclosure, the DL MAC PDU may include the MAC SDU indicator if the T2 indicator indicates that the DL MAC PDU includes a CRID. The UE may obtain or process a MAC SDU from the DL MAC PDU if the DL MAC PDU includes a CRID, if a CRID in the DL MAC PDU matches a CCCH SDU that the UE transmitted in the MsgA, and if a MAC SDU indicator associated with the CIRD that matches the CCCH SDU transmitted by the UE in the MsgA is set a value representing the presence of the MAC SDU.

Figure 22:
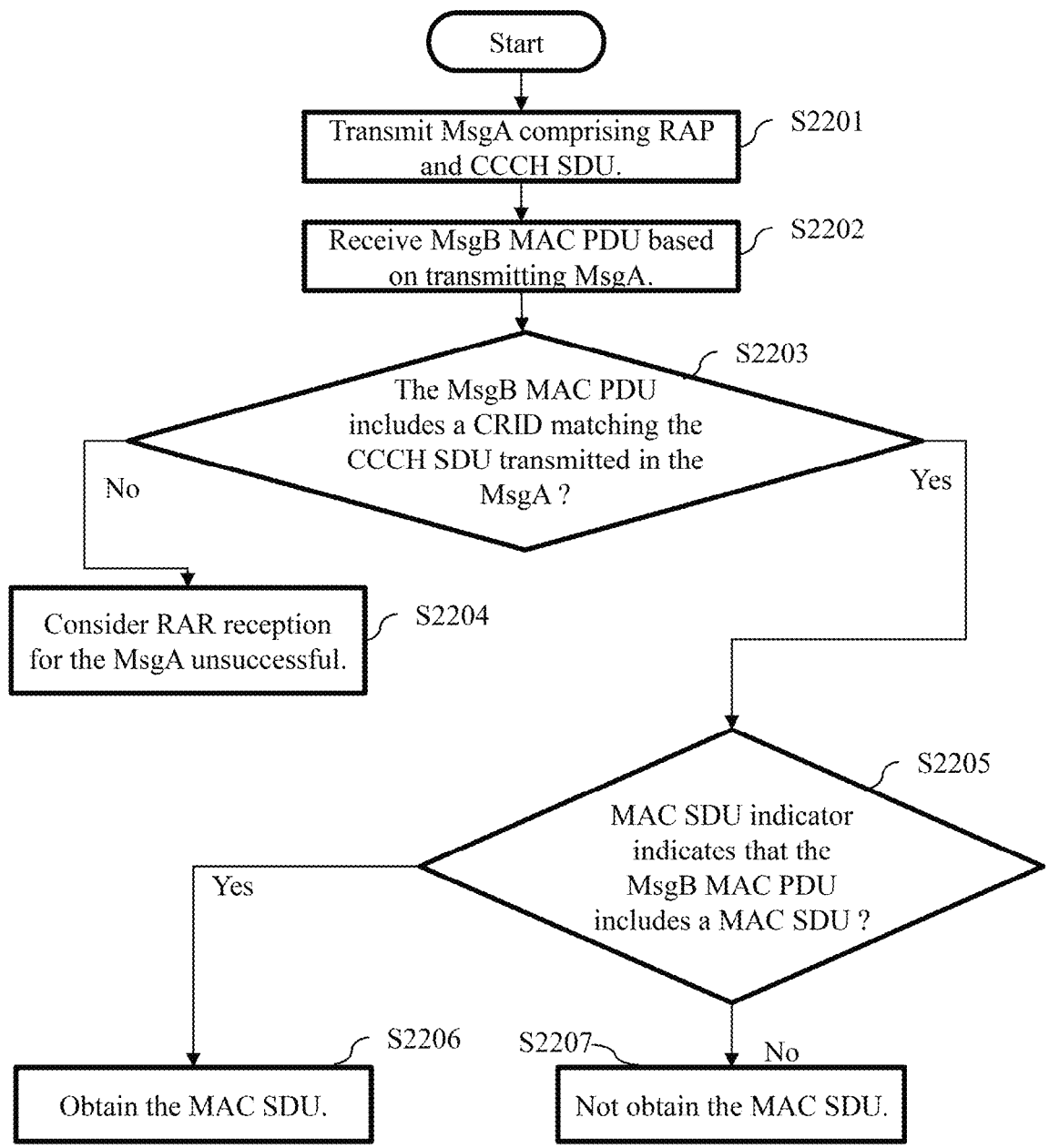
FIG. 22 illustrates an example of RAR reception at a UE side according to some implementations of the present disclosure.

FIG. 22 illustrates an example of RAR reception at a UE side according to some implementations of the present disclosure.

In some scenarios, a UE may trigger a 2-step RACH. Referring to FIG. 21, the UE transmits an MsgA which comprises i) an RAP and ii) a UL MAC PDU including a CCCH SDU (S2201). The UE may start a window for MsgB/RAR reception based on transmitting the MsgA. The UE monitors a DL MAC PDU addressed to a RNTI for MsgB/RAR while the window is running.

If T1 in a subheader included in the DL MAC PDU indicates that this subheader contains a RAPID, the UE compares the RAPID with a RAPID of the RAP which was transmitted in the MsgA. If the RAP ID matches the RAPID of the RAP transmitted in the MsgA, the UE may consider only the RAP of the MsgA successfully transmitted (and consider the PUSCH of the MsgA unsuccessfully transmitted). If the RAP ID matches the RAPID of the RAP transmitted in the MsgA, the UE, the UE may receive or process the remaining contents (e.g., fallback RAR payload) for the RAPID. The contents of the fallback RAR payload may include timing advance command, TC-RNTI and UL grant. The UE may (re-)transmit a MAC SDU of MsgA based on the UL grant included in the fallback RAR payload.

If the window expires, the UE may consider the contention resolution for the 2-step RACH procedure as not successful.

If the UE fails to receive a DL MAC PDU addressed to the RNTII for MsgB/RAR while the window is running, or if the UE receives a DL MAC PDU addressed to the RNTI for Msg/RAR but the DL MAC PDU does not include neither an RAPID matching an RAPID of the RAP transmitted in the MsgA nor a CRID matching the CCCH SDU transmitted in the MsgA, the UE may consider the RAR reception for the MsgA as unsuccessful (S2204). If the DL MAC PDU includes a BI, the UE may set PREAMBLE_BACKOFF to a value of the BI. If the DL MAC PDU does not include a BI, the UE may set PREAMBLE_BACKOFF to 0 ms. The UE may select a random backoff time according to a uniform distribution between 0 to the PREAMBLE_BACKOFF. If the window expires and the RAR reception has not been considered as successful, the UE may perform a MsgA transmission for the 2-step RACH procedure after the backoff time.

If the UE receives a DL MAC PDU for an MsgB/RAR (S2202), the UE may determine whether the DL MAC PDU includes a CRID field (S2203).

In some implementations of the present disclosure, the UE may determine that the DL MAC PDU includes a CRID field based on T1 and T2 fields in a subheader included in the DL MAC PDU. For example, if the UE receives a DL MAC PDU for an MsgB/RAR, the UE may check a T1 field in the DL MAC PDU. If T1 in a subheader included in the DL MAC PDU indicates that this subheader does not contain a RAPID, the UE checks the T2 field. If the T2 field indicates that this subheader contains a BO indicator. The UE sets the PREAMBLE_BACKOFF to BO indicator value.

If T2 in a subheader included in the DL MAC PDU is set to a value representing that there is a CRID, the UE may determine that there is a success RAR associated with the subheader. For example, if the T2 field indicates that this subheader does not indicate a BO indicator (e.g., the T2 field indicates that this subheader contains a CRID) (S2203, Yes), the UE compares the CRID with the CCCH SDU which was transmitted in the MsgA. If the CRID matches the CCCH SDU, the UE receives or processes the remaining contents (e.g., success RAR payload) for the CRID. In some implementations of the present disclosure, if the CRID matches the CCCH SDU, the UE may consider this contention resolution successful and finish the disassembly and demultiplexing of the DL MAC PDU.

In some implementations of the present disclosure, the DL MAC PDU may include a MAC SDU indicator related to the CRID. Based on the MAC SDU indicator set to a value representing the presence of a MAC SDU related to the CRID (S2205, Yes), the UE may obtain or process the MAC SDU from the DL MAC PDU (S2206). If the MAC SDU indicator is set to a value representing the absence of a MAC SDU related to the CRID of the UE (S2305, No), the UE does not have to attempt to obtain a MAC SDU related to the CRID from the DL MAC PDU (S2207).

In some implementations of the present disclosure, a BS may monitor an MsgA that comprises i) a RAP and ii) a MAC PDU including a CCCH SDU. If the BS receives a RAP and/or a MAC PDU including a CCCH SDU, the BS may start a window for RAR transmission.

If the BS successfully receives both the RAP of the MsgA and the MAC PDU of the MsgA, the BS may set a CRID to the CCCH SDU which was received from the MsgA, and generate a MAC subPDU that comprises the CRID and a success RAR for the UE. The MAC subheader may include fields E, T1 and T2, where T1 is set to a value indicating that the MAC subheader does not include a RAPID, and where T2 is set to a value indicating that the MAC subheader does not include a BI (e.g. the T2 field indicates that there is a CRID). In some implementations of the present disclosure, the MAC subheader may include four header fields E/T1/T2/CRID, where the T1 field indicates that there is no RAPID, the T2 field indicates that there is a CRID. If the MAC subPDU includes a T2 field and the T2 field is set to a value representing that there is a CRID, the BS may further include a MAC SDU indicator in the MAC subPDU. If the BS includes a MAC SDU in a DL MAC PDU transmitted in response to receiving the MsgA, the BS may set the MAC SDU indicator to indicate that there is a MAC SDU. If the BS does include a MAC SDU in a DL MAC PDU transmitted in response to receiving the whole or part of the MsgA, the BS may set the MAC SDU indicator to indicate that there is no MAC SDU related to the CRID. In some implementations of the present disclosure, the success RAR may consist of at least timing advance command, C-RNTI, UL grant, and/or MAC SDU indicator.

If the BS successfully receives only a RAP of a MsgA between the RAP of the MsgA and a CCCH SDU of the MsgA, the BS may set a RAPID to a RAPID of the RAP of the MsgA, and generate a MAC subPDU that comprises a MAC subheader with the RAPID and a fallback RAR for the UE. In some implementations of the present disclosure, the MAC subheader with the RAPID may consist of three header fields E/T1/RAPID, where the T1 field indicates that there is a RAPID, and the fallback RAR consists of at least one of timing advance command, TC-RNTI and UL grant.

The BS may decide to transmit a BO indicator instead of transmitting a fallback and/or success RAR to the UE. If the BS decides to transmit a BO indicator, the BS may set a BO indicator and generate a MAC subPDU consisting of a MAC subheader with the BO indicator only. In some implementations of the present disclosure, the MAC subheader with the BO indicator may consist of five header fields E/T1/T2/R/BI, where the T1 field indicates that there is no RAPID and the T2 field indicates that there is a BO indicator.

In some implementations of the BS may multiplex one or more MAC subPDU(s) into a MAC PDU. The BS may transmit the MAC PDU while the window is running.

If the success RAR is indicated by an indicator in the RAR payload of the 4-step RACH procedure, the UE should additionally check the CRID after decoding the RAPID. In other words, if the indicator indicating whether this MAC subPDU contains the CRID or not is used by the reserved bit in the RAR payload of the 4-step RACH procedure, the UE should always decode/check the RAPID subheader before comparing the CRID with the CCCH SDU. However if the UE successfully transmitted the MsgA, the UE may resolve the contention by the CRID only, and it is unnecessary to decode the RAPID.

The parameters (e.g. ra-PreambleIndex, ra-ResponseWindow, and etc.) for the RA procedure of the present disclosure may be configured to the UE by a BS via RRC signalling. For example, a window during which a UE monitors a DL MAC PDU for MsgB may be determined based on a parameter provided by a BS.

In some implementations of the present disclosure, the UL data payload transmitted in MsgA may be transmitted/received on a physical channel (e.g. PUSCH) based on resource allocation (e.g. UL grant). In order to transmit the UL data payload (e.g. UL MAC PDU), a UE shall have uplink resources available to the UE. In order for a BS to receive the UL payload of MsgA, the BS may have uplink resources available to the UE.

In some implementations of the present disclosure, a MsgB MAC PDU may be transmitted/received on a physical channel (e.g. PDCCH) based on resource allocation (e.g. DL assignment). In order to receive a DL MAC PDU a UE shall have downlink resources available to the UE. In order for a BS to transmit the DL MAC PDU, the BS may have downlink resources available to the UE.

In the present disclosure, uplink resource allocation is also referred to as uplink grant, and downlink resource allocation is also referred to as downlink assignment. The resource allocation includes time domain resource allocation and frequency domain resource allocation.

In order to transmit data unit(s) of the present disclosure on UL-SCH, a UE shall have uplink resources available to the UE. In order to receive data unit(s) of the present disclosure on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a Random Access Response, or configured to the UE semi-persistently by RRC. Downlink assignment is either received by the UE dynamically on the PDCCH, or configured to the UE semi-persistently by RRC signaling from the BS.

In UL, the BS can dynamically allocate resources to UEs via the Cell Radio Network Temporary Identifier (C-RNTI) on PDCCH(s). A UE always monitors the PDCCH(s) in order to find possible grants for uplink transmission when its downlink reception is enabled (activity governed by discontinuous reception (DRX) when configured). In addition, with Configured Grants, the BS can allocate uplink resources for the initial HARQ transmissions to UEs. Two types of configured uplink grants are defined: Type 1 and Type 2. With Type 1, RRC directly provides the configured uplink grant (including the periodicity). With Type 2, RRC defines the periodicity of the configured uplink grant while PDCCH addressed to Configured Scheduling RNTI (CS-RNTI) can either signal and activate the configured uplink grant, or deactivate it; i.e. a PDCCH addressed to CS-RNTI indicates that the uplink grant can be implicitly reused according to the periodicity defined by RRC, until deactivated.

In DL, the BS can dynamically allocate resources to UEs via the C-RNTI on PDCCH(s). A UE always monitors the PDCCH(s) in order to find possible assignments when its downlink reception is enabled (activity governed by DRX when configured). In addition, with Semi-Persistent Scheduling (SPS), the BS can allocate downlink resources for the initial HARQ transmissions to UEs: RRC defines the periodicity of the configured downlink assignments while PDCCH addressed to CS-RNTI can either signal and activate the configured downlink assignment, or deactivate it. In other words, a PDCCH addressed to CS-RNTI indicates that the downlink assignment can be implicitly reused according to the periodicity defined by RRC, until deactivated.

Resource Allocation by PDCCH (i.e. Resource Allocation by DCI)

PDCCH can be used to schedule DL transmissions on PDSCH and UL transmissions on PUSCH, where the downlink control information (DCI) on PDCCH includes: downlink assignments containing at least modulation and coding format (e.g., modulation and coding scheme (MCS) index $I_{MCS}$), resource allocation, and hybrid-ARQ information related to DL-SCH; or uplink scheduling grants containing at least modulation and coding format, resource allocation, and hybrid-ARQ information related to UL-SCH. The size and usage of the DCI carried by one PDCCH are varied depending on DCI formats. For example, in the 3GPP NR system, DCI format 0_0 or DCI format 0_1 is used for scheduling of PUSCH in one cell, and DCI format 1_0 or DCI format 1_1 is used for scheduling of PDSCH in one cell.

Figure 23:
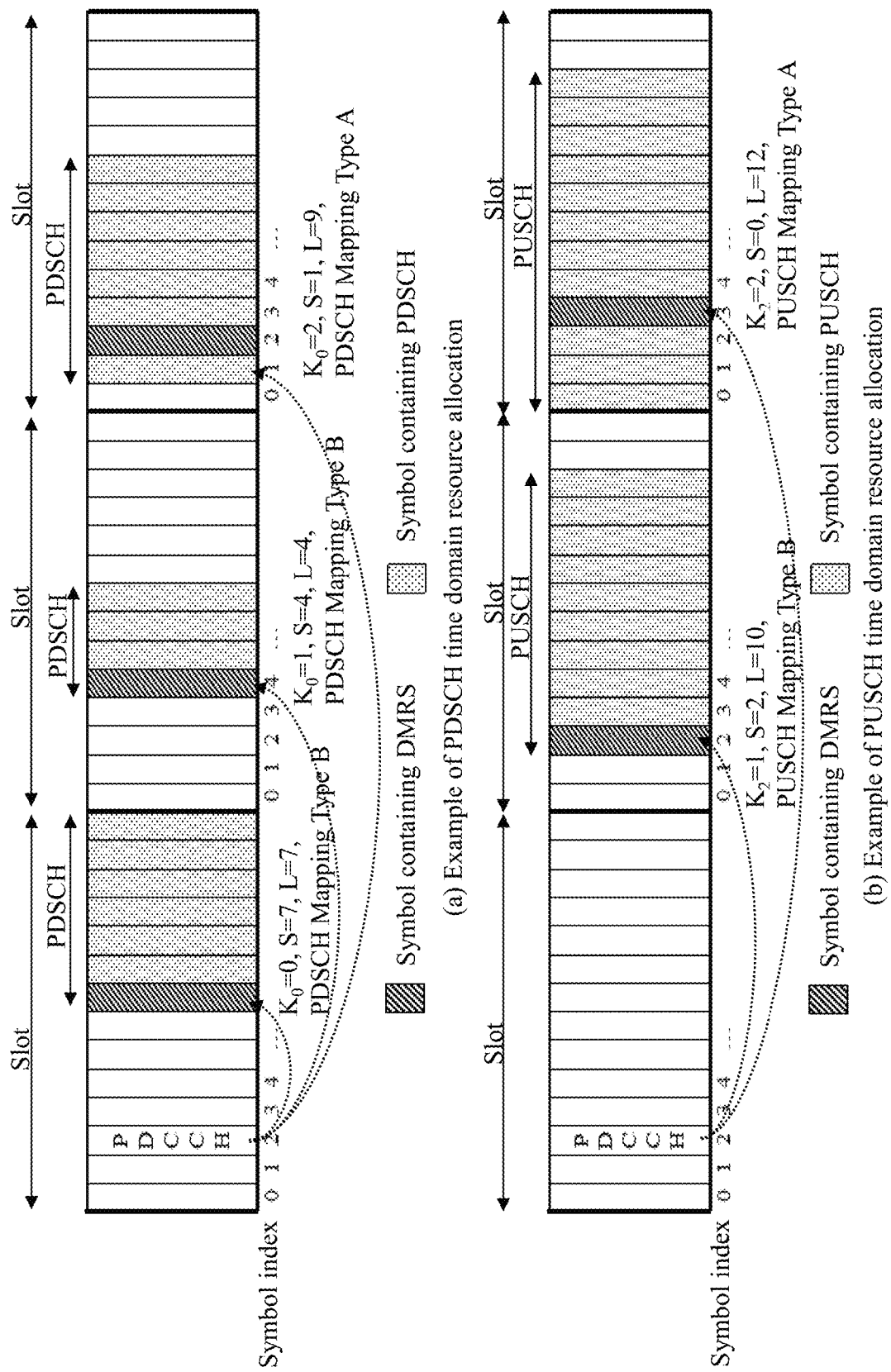
FIG. 23 illustrates an example of PDSCH time domain resource allocation by PDCCH, and an example of PUSCH time resource allocation by PDCCH.

FIG. 23 illustrates an example of PDSCH time domain resource allocation by PDCCH, and an example of PUSCH time resource allocation by PDCCH.

Downlink control information (DCI) carried by a PDCCH for scheduling PDSCH or PUSCH includes a value m for a row index m+1 to an allocation table for PDSCH or PUSCH. Either a predefined default PDSCH time domain allocation A, B or C is applied as the allocation table for PDSCH, or RRC configured pdsch-TimeDomainAllocationList is applied as the allocation table for PDSCH. Either a predefined default PUSCH time domain allocation A is applied as the allocation table for PUSCH, or the RRC configured pusch-TimeDomainAllocationList is applied as the allocation table for PUSCH. Which PDSCH time domain resource allocation configuration to apply and which PUSCH time domain resource allocation table to apply are determined according to a fixed/predefined rule (e.g. Table 5.1.2.1.1-1 in 3GPP TS 38.214 v15.3.0, Table 6.1.2.1.1-1 in 3GPP TS 38.214 v15.3.0).

Each indexed row in PDSCH time domain allocation configurations defines the slot offset $K_0$, the start and length indicator SLIV, or directly the start symbol S and the allocation length L, and the PDSCH mapping type to be assumed in the PDSCH reception. Each indexed row in PUSCH time domain allocation configurations defines the slot offset $K_2$, the start and length indicator SLIV, or directly the start symbol S and the allocation length L, and the PUSCH mapping type to be assumed in the PUSCH reception. $K_0$ for PDSCH, or $K_2$ for PUSCH is the timing difference between a slot with a PDCCH and a slot with PDSCH or PUSCH corresponding to the PDCCH. SLIV is a joint indication of starting symbol S relative to the start of the slot with PDSCH or PUSCH, and the number L of consecutive symbols counting from the symbol S. For PDSCH/PUSCH mapping type, there are two mapping types: one is Mapping Type A where demodulation reference signal (DMRS) is positioned in $3^{rd}$ or $4^{th}$ symbol of a slot depending on the RRC signaling, and other one is Mapping Type B where DMRS is positioned in the first allocated symbol.

The scheduling DCI includes the Frequency domain resource assignment field which provides assignment information on resource blocks used for PDSCH or PUSCH. For example, the Frequency domain resource assignment field may provide a UE with information on a cell for PDSCH or PUSCH transmission, information on a bandwidth part for PDSCH or PUSCH transmission, information on resource blocks for PDSCH or PUSCH transmission.

*Resource Allocation by RRC

As mentioned above, in uplink, there are two types of transmission without dynamic grant: configured grant Type 1 where an uplink grant is provided by RRC, and stored as configured grant; and configured grant Type 2 where an uplink grant is provided by PDCCH, and stored or cleared as configured uplink grant based on L1 signaling indicating configured uplink grant activation or deactivation. Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

A UE is provided with at least the following parameters via RRC signaling from a BS when the configured grant type 1 is configured:

cs-RNTI which is CS-RNTI for retransmission;

periodicity which provides periodicity of the configured grant Type 1;

timeDomainOffset which represents offset of a resource with respect to SFN=0 in time domain;

timeDomainAllocation value m which provides a row index m+1 pointing to an allocation table, indicating a combination of a start symbol S and length L and PUSCH mapping type;

frequencyDomainAllocation which provides frequency domain resource allocation; and mcsAndTBS which provides $I_{MCS}$ representing the modulation order, target code rate and transport block size. Upon configuration of a configured grant Type 1 for a serving cell by RRC, the UE stores the uplink grant provided by RRC as a configured uplink grant for the indicated serving cell, and initialise or re-initialise the configured uplink grant to start in the symbol according to timeDomainOffset and S (derived from SLIV), and to reoccur with periodicity. After an uplink grant is configured for a configured grant Type 1, the UE considers that the uplink grant recurs associated with each symbol for which: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0.

A UE is provided with at least the following parameters via RRC signaling from a BS when the configured gran Type 2 is configured:

cs-RNTI which is CS-RNTI for activation, deactivation, and retransmission; and periodicity which provides periodicity of the configured grant Type 2. The actual uplink grant is provided to the UE by the PDCCH (addressed to CS-RNTI). After an uplink grant is configured for a configured grant Type 2, the UE considers that the uplink grant recurs associated with each symbol for which: [(SFN numberOfSlotsPerFrame numberOfSymbolsPerSlot)+(slot number in the frame*numberOfSymbolsPerSlot)+symbol number in the slot]= [(SFN$_{start\ time}$*numberOfSlotsPerFrame*numberOfSymbolsPerSlot+slot$_{start\ time}$*numberOfSymbolsPerSlot+symbol$_{start\ time}$)+N*periodicity] modulo (1024*numberOfSlotsPerFrame*numberOfSymbolsPerSlot), for all N>=0, where SFN$_{start\ time}$, slot$_{start\ time}$, and symbol$_{start\ time}$ are the SFN, slot, and symbol, respectively, of the first transmission opportunity of PUSCH where the configured uplink grant was (re-) initialised. numberOfSlotsPerFrame and numberOfSymbolsPerSlot refer to the number of consecutive slots per frame and the number of consecutive OFDM symbols per slot, respectively (see Table 1 and Table 2).

For configured uplink grants, the HARQ Process ID associated with the first symbol of a UL transmission is derived from the following equation:

HARQ Process ID=[floor(CURRENT_symbol/periodicity)]modulo nrofHARQ-Processes where CURRENT_symbol= (SFN*numberOfSlotsPerFrame*numberOfSymbolsPerSlot+ slot number in the frame*numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211. CURRENT_symbol refers to the symbol index of the first transmission occasion of a repetition bundle that takes place. A HARQ process is configured for a configured uplink grant if the configured uplink grant is activated and the associated HARQ process ID is less than nrofHARQ-Processes.

For downlink, a UE may be configured with semi-persistent scheduling (SPS) per serving cell and per BWP by RRC signaling from a BS. Multiple configurations can be active simultaneously only on different serving cells. Activation and deactivation of the DL SPS are independent among the serving cells. For DL SPS, a DL assignment is provided to the UE by PDCCH, and stored or cleared based on L1 signaling indicating SPS activation or deactivation. A UE is provided with the following parameters via RRC signaling from a BS when SPS is configured:

cs-RNTI which is CS-RNTI for activation, deactivation, and retransmission;

nrofHARQ-Processes: which provides the number of configured HARQ processes for SPS;

periodicity which provides periodicity of configured downlink assignment for SPS. When SPS is released by upper layers, all the corresponding configurations shall be released.

After a downlink assignment is configured for SPS, the UE considers sequentially that the $N^{th}$ downlink assignment occurs in the slot for which: (numberOfSlotsPerFrame*SFN+slot number in the frame)= [(numberOfSlotsPerFrame*SFN$_{start\ time}$+slot$_{start\ time}$)+ N*periodicity*numberOfSlotsPerFrame/10] modulo (1024*numberOfSlotsPerFrame), where SFN$_{start\ time}$ and slot$_{start\ time}$ are the SFN and slot, respectively, of the first transmission of PDSCH where the configured downlink assignment was (re-)initialised.

For configured downlink assignments, the HARQ Process ID associated with the slot where the DL transmission starts is derived from the following equation:

HARQ Process ID=[floor(CURRENT_slot*10/ (numberOfSlotsPerFrame*periodicity))]modulo nrofHARQ-Processes where CURRENT_slot=[(SFN*numberOfSlotsPerFrame)+slot number in the frame] and numberOfSlotsPerFrame refers to the number of consecutive slots per frame as specified in TS 38.211.

A UE validates, for scheduling activation or scheduling release, a DL SPS assignment PDCCH or configured UL grant type 2 PDCCH if the cyclic redundancy check (CRC) of a corresponding DCI format is scrambled with CS-RNTI provided by the RRC parameter cs-RNTI and the new data indicator field for the enabled transport block is set to 0. Validation of the DCI format is achieved if all fields for the DCI format are set according to Table 7 or Table 8. Table 7 shows special fields for DL SPS and UL grant Type 2 scheduling activation PDCCH validation, and Table 8 shows special fields for DL SPS and UL grant Type 2 scheduling release PDCCH validation.

TABLE 7

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 8

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and actual UL grant, and the corresponding modulation and coding scheme are provided by the resource assignment fields (e.g. time domain resource assignment field which provides Time domain resource assignment value m, frequency domain resource assignment field which provides the frequency resource block allocation, modulation and coding scheme field) in the DCI format carried by the DL SPS and UL grant Type 2 scheduling activation PDCCH. If validation is achieved, the UE considers the information in the DCI format as valid activation or valid release of DL SPS or configured UL grant Type 2.

The time-frequency resource for PUSCH of the MsgA may be predefined to have a certain mapping relation with the PRACH occasion (e.g. time-frequency resource for transmission of the RAP) and/or the RAPID of the RAP in the MsgA. Alternatively, the time-frequency resource for PUSCH of the MsgA may be configured or allocated by the BS to have a certain mapping relation with the PRACH occasion (e.g. time-frequency resource for transmission of the RAP) and/or the RAPID of the RAP in the MsgA. The UE transmitting the MsgA monitors a PDCCH addressed to an MsgB-RNTI (or RA-RNTI) to receive a MAC PDU for MsgB.

The processor(s) 102 of the present disclosure may transmit (or control the transceiver(s) 106 to transmit) the UL data payload of the MsgA based on the UL grant available to the processor(s) 102. The processor(s) 202 may receive (or control its transceiver(s) 206 to receive) the UL data payload of the MsgA based on the UL grant available to the UE.

The processor(s) 102 of the present disclosure may receive (or control the transceiver(s) 106 to receive) MsgB in response to the MsgA. The processor(s) 202 may transmit (or control its transceiver(s) 206 to transmit) a MAC PDU for MsgB, based on DL assignment available to the UE.

The UL or DL data is subject to the physical layer processing at a transmitting side before transmission via radio interface, and the radio signals carrying the UL or DL data are subject to the physical layer processing at a receiving side. For example, a MAC PDU including the UL payload of the MsgA and/or an MsgB MAC PDU may be subject to the physical layer processing as follows.

Figure 24:
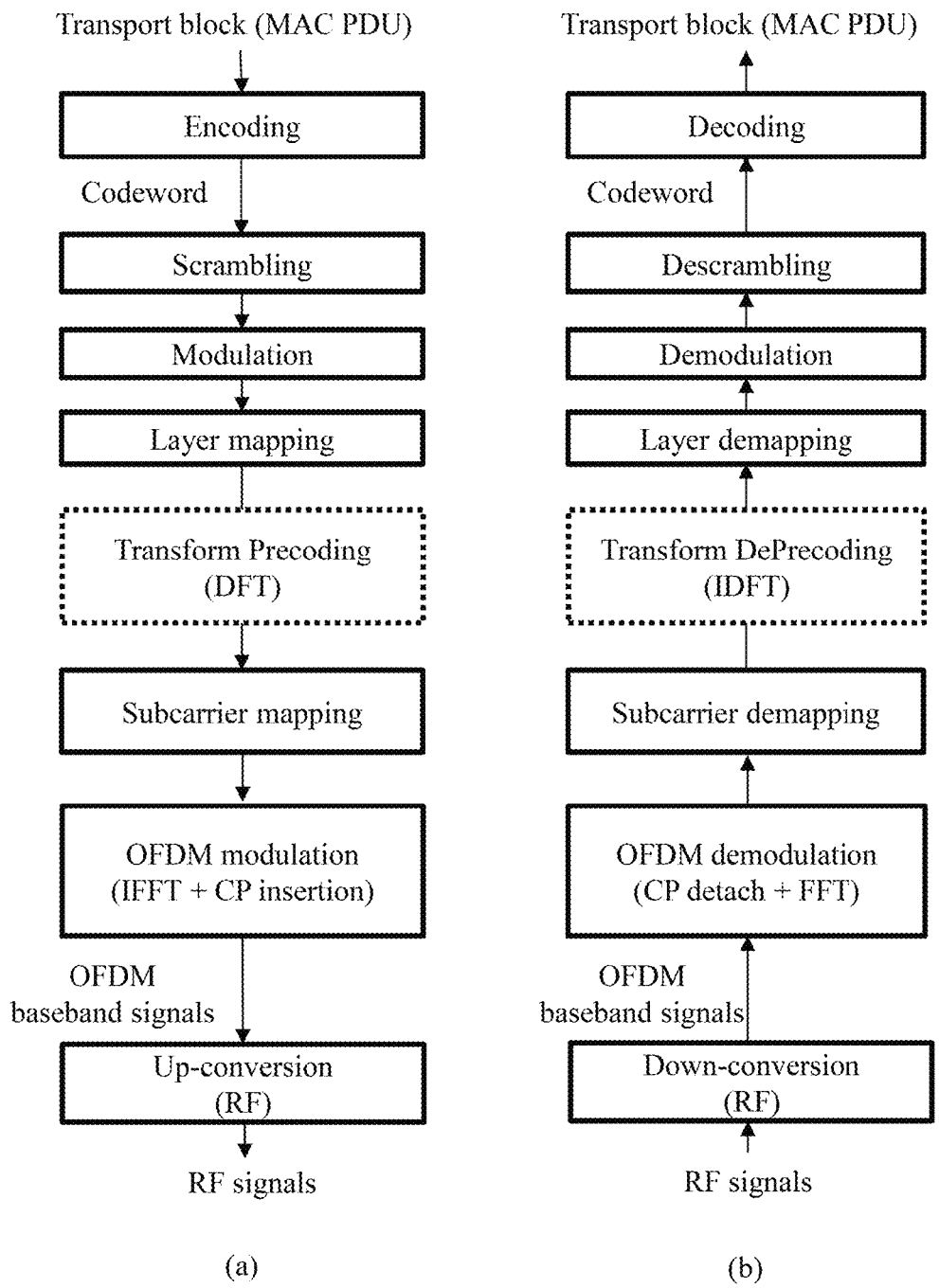
FIG. 24 illustrates an example of physical layer processing for some implementations of the present disclosure.

FIG. 24 illustrates an example of physical layer processing for some implementations of the present disclosure.

FIG. 24(a) illustrates an example of physical layer processing at a transmitting side.

The following tables show the mapping of the transport channels (TrCHs) and control information to its corresponding physical channels. In particular, Table 9 specifies the mapping of the uplink transport channels to their corresponding physical channels, Table 10 specifies the mapping of the uplink control channel information to its corresponding physical channel, Table 11 specifies the mapping of the downlink transport channels to their corresponding physical channels, and Table 12 specifies the mapping of the downlink control channel information to its corresponding physical channel.

TABLE 9

| TrCH | Physical Channel |
|---|---|
| UL-SCH | PUSCH |
| RACH | PRACH |

TABLE 10

| Control information | Physical Channel |
|---|---|
| UCI | PUCCH, PUSCH |

TABLE 11

| TrCH | Physical Channel |
|---|---|
| DL-SCH | PDSCH |
| BCH | PBCH |
| PCH | PDSCH |

TABLE 12

| Control information | Physical Channel |
|---|---|
| DCI | PDCCH |

*Encoding

Data and control streams from/to MAC layer are encoded to offer transport and control services over the radio transmission link in the PHY layer. For example, a transport block from MAC layer is encoded into a codeword at a transmitting side. Channel coding scheme is a combination of error detection, error correcting, rate matching, interleaving and transport channel or control information mapping onto/splitting from physical channels.

In the 3GPP NR system, following channel coding schemes are used for the different types of TrCH and the different control information types.

TABLE 13

| TrCH | Coding scheme |
|---|---|
| UL-SCH | LDPC |
| DL-SCH | |
| PCH | |
| BCH | Polar code |

TABLE 14

| Control Information | Coding scheme |
| --- | --- |
| DCI | Polar code |
| UCI | Block code |
|  | Polar code |

For transmission of a DL transport block (i.e. a DL MAC PDU) or a UL transport block (i.e. a UL MAC PDU), a transport block CRC sequence is attached to provide error detection for a receiving side. In the 3GPP NR system, the communication device uses low density parity check (LDPC) codes in encoding/decoding UL-SCH and DL-SCH. The 3GPP NR system supports two LDPC base graphs (i.e. two LDPC base matrixes): LDPC base graph 1 optimized for small transport blocks and LDPC base graph 2 for larger transport blocks. Either LDPC base graph 1 or 2 is selected based on the size of the transport block and coding rate R. The coding rate R is indicated by the modulation coding scheme (MCS) index $I_{MCS}$. The MCS index is dynamically provided to a UE by PDCCH scheduling PUSCH or PDSCH, provided to a UE by PDCCH activating or (re-) initializing the UL configured grant 2 or DL SPS, or provided to a UE by RRC signaling related to the UL configured grant Type 1. If the CRC attached transport block is larger than the maximum code block size for the selected LDPC base graph, the CRC attached transport block may be segmented into code blocks, and an additional CRC sequence is attached to each code block. The maximum code block sizes for the LDPC base graph 1 and the LDPC base graph 2 are 8448 bits and 3480 bits, respectively. If the CRC attached transport block is not larger than the maximum code block size for the selected LDPC base graph, the CRC attached transport block is encoded with the selected LDPC base graph. Each code block of the transport block is encoded with the selected LDPC base graph. The LDPC coded blocks are then individually rat matched. Code block concatenation is performed to create a codeword for transmission on PDSCH or PUSCH. For PDSCH, up to 2 codewords (i.e. up to 2 transport blocks) can be transmitted simultaneously on the PDSCH. PUSCH can be used for transmission of UL-SCH data and layer 1/2 control information. Although not shown in FIG. 24, the layer 1/2 control information may be multiplexed with the codeword for UL-SCH data.

*Scrambling and Modulation

The bits of the codeword are scrambled and modulated to generate a block of complex-valued modulation symbols.

*Layer Mapping

The complex-valued modulation symbols of the codeword are mapped to one or more multiple input multiple output (MIMO) layers. A codeword can be mapped to up to 4 layers. A PDSCH can carry two codewords, and thus a PDSCH can support up to 8-layer transmission. A PUSCH supports a single codeword, and thus a PUSCH can support up to 4-layer transmission.

*Transform Precoding

The DL transmission waveform is conventional OFDM using a cyclic prefix (CP). For DL, transform precoding (in other words, discrete Fourier transform (DFT)) is not applied.

The UL transmission waveform is conventional OFDM using a CP with a transform precoding function performing DFT spreading that can be disabled or enabled. In the 3GPP NR system, for UL, the transform precoding can be optionally applied if enabled. The transform precoding is to spread UL data in a special way to reduce peak-to-average power ratio (PAPR) of the waveform. The transform precoding is a form of DFT. In other words, the 3GPP NR system supports two options for UL waveform: one is CP-OFDM (same as DL waveform) and the other one is DFT-s-OFDM. Whether a UE has to use CP-OFDM or DFT-s-OFDM is configured by a BS via RRC parameters.

*Subcarrier Mapping

The layers are mapped to antenna ports. In DL, for the layers to antenna ports mapping, a transparent manner (non-codebook based) mapping is supported and how beamforming or MIMO precoding is performed is transparent to the UE. In UL, for the layers to antenna ports mapping, both the non-codebook based mapping and a codebook based mapping are supported.

For each antenna port (i.e. layer) used for transmission of the physical channel (e.g. PDSCH, PUSCH), the complex-valued modulation symbols are mapped to subcarriers in resource blocks allocated to the physical channel.

*OFDM Modulation

The communication device at the transmitting side generates a time-continuous OFDM baseband signal on antenna port p and subcarrier spacing configuration u for OFDM symbol l in a TTI for a physical channel by adding a cyclic prefix (CP) and performing IFFT. For example, for each OFDM symbol, the communication device at the transmitting side may perform inverse fast Fourier transform (IFFT) on the complex-valued modulation symbols mapped to resource blocks in the corresponding OFDM symbol and add a CP to the IFFT-ed signal to generate the OFDM baseband signal.

*Up-Conversion

The communication device at the transmitting side up-converts the OFDM baseband signal for antenna port p, subcarrier spacing configuration u and OFDM symbol l to a carrier frequency $f_0$ of a cell to which the physical channel is assigned.

The processors 102 and 202 in FIG. 2 may be configured to perform encoding, scrambling, modulation, layer mapping, transform precoding (for UL), subcarrier mapping, and OFDM modulation. The processors 102 and 202 may control the transceivers 106 and 206 connected to the processors 102 and 202 to up-convert the OFDM baseband signal onto the carrier frequency to generate radio frequency (RF) signals. The radio frequency signals are transmitted through antennas 108 and 208 to an external device.

FIG. 24(b) illustrates an example of physical layer processing at a receiving side.

The physical layer processing at the receiving side is basically the inverse processing of the physical layer processing at the transmitting side.

*Frequency Down-Conversion

The communication device at a receiving side receives RF signals at a carrier frequency through antennas. The transceivers 106 and 206 receiving the RF signals at the carrier frequency down-converts the carrier frequency of the RF signals into the baseband in order to obtain OFDM baseband signals.

*OFDM Demodulation

The communication device at the receiving side obtains complex-valued modulation symbols via CP detachment and FFT. For example, for each OFDM symbol, the communication device at the receiving side removes a CP from the OFDM baseband signals and performs FFT on the CP-removed OFDM baseband signals to obtain complex-valued modulation symbols for antenna port p, subcarrier spacing u and OFDM symbol l.

*Subcarrier Demapping

The subcarrier demapping is performed on the complex-valued modulation symbols to obtain complex-valued modulation symbols of a corresponding physical channel. For example, the processor(s) 102 may obtain complex-valued modulation symbols mapped to subcarriers belong to PDSCH from among complex-valued modulation symbols received in a bandwidth part. For another example, the processor(s) 202 may obtain complex-valued modulation symbols mapped to subcarriers belong to PUSCH from among complex-valued modulation symbols received in a bandwidth part.

*Transform De-Precoding

Transform de-precoding (e.g. IDFT) is performed on the complex-valued modulation symbols of the uplink physical channel if the transform precoding has been enabled for the uplink physical channel. For the downlink physical channel and for the uplink physical channel for which the transform precoding has been disabled, the transform de-precoding is not performed.

*Layer Demapping.

The complex-valued modulation symbols are de-mapped into one or two codewords.

*Demodulation and Descrambling

The complex-valued modulation symbols of a codeword are demodulated and descrambled into bits of the codeword.

*Decoding

The codeword is decoded into a transport block. For UL-SCH and DL-SCH, either LDPC base graph 1 or 2 is selected based on the size of the transport block and coding rate R. The codeword may include one or multiple coded blocks. Each coded block is decoded with the selected LDPC base graph into a CRC-attached code block or CRC-attached transport block. If code block segmentation was performed on a CRC-attached transport block at the transmitting side, a CRC sequence is removed from each of CRC-attached code blocks, whereby code blocks are obtained. The code blocks are concatenated into a CRC-attached transport block. The transport block CRC sequence is removed from the CRC-attached transport block, whereby the transport block is obtained. The transport block is delivered to the MAC layer.

In the above described physical layer processing at the transmitting and receiving sides, the time and frequency domain resources (e.g. OFDM symbol, subcarriers, carrier frequency) related to subcarrier mapping, OFDM modulation and frequency up/down conversion can be determined based on the resource allocation (e.g., UL grant, DL assignment).

For uplink data transmission, the processor(s) 102 of the present disclosure may apply (or control the transceiver(s) 106 to apply) the above described physical layer processing of the transmitting side to UL data/signal (e.g. MAC PDU) of the present disclosure to transmit the UL data/signal wirelessly. For uplink data reception, the processor(s) 102 of the present disclosure may apply (or control the transceiver(s) 106 to apply) the above described physical layer processing of the receiving side to received radio signals to obtain the UL data/signal of the present disclosure.

For downlink data transmission, the processor(s) 202 of the present disclosure may apply (or control the transceiver(s) 206 to apply) the above described physical layer processing of the transmitting side to DL data/signal (e.g. MAC PDU) of the present disclosure to transmit the DL data/signal wirelessly. For downlink data reception, the processor(s) 202 of the present disclosure may apply (or control the transceiver(s) 206 to apply) the above described physical layer processing of the receiving side to received radio signals to obtain DL data/signal of the present disclosure.

The processor(s) 102 may apply the above described physical layer processing of the transmitting side to the UL payload of the MsgA to transmit the UL payload of the MsgA message wirelessly. The processor(s) 202 may apply the above described physical layer processing of the receiving side to received radio signals to obtain the UL payload of the MsgA transmitted by the first device.

The processor(s) 202 may apply the above described physical layer processing of the transmitting side to an MsgB MAC PDU to transmit the MsgB MAC PDU wirelessly. The processor(s) 102 may apply the above described physical layer processing of the receiving side to received radio signals to obtain the MsgB MAC PDU transmitted by the second device.

In some implementations of the present disclosure, an RAP is transmitted in a preamble format. A preamble format for a RA procedure of the present disclosure may consist of a cyclic prefix (CP) and a sequence part in a time domain, or consist of a CP part, a sequence part and a guard period (GP) in the time domain. In a GP of a preamble format, no signal is transmitted by a UE. The processor(s) 102 of the first device 100 may be configured to perform the OFDM modulation and the upconversion to the RAP. For example, the processor(s) 102 at the UE side generates a time-continuous OFDM baseband signal on antenna port p for PRACH by adding a cyclic prefix (CP) and performing IFFT. For example, the processor(s) 102 of the first device may perform inverse fast Fourier transform (IFFT) on a preamble part containing the RAP and add a CP to the IFFT-ed signal to generate the OFDM baseband signal for the PRACH. The processor(s) 102 controls the transceiver(s) 106 to up-convert the OFDM baseband signal for antenna port p for PRACH to a carrier frequency $f_0$ of a cell via which the RAP is transmitted.

The processor(s) 202 of the second device may be configured to control the transceiver(s) 206 to down-convert the RF signals received at a carrier frequency in a PRACH occasion (e.g. time-frequency resource for PRACH) in the baseband signal in order to obtain OFDM baseband signals for PRACH. The processor(s) 202 may obtain an RAP via CP detachment and FFT. For example, processor(s) 202 of the second device removes a CP from the OFDM baseband signals for PRACH and performs FFT on the CP-removed OFDM baseband signals to obtain the RAP for antenna port p for PRACH.

If the processor(s) 202 obtains both an RAP in an MsgA of a first device 100 and a payload in the MsgA successfully, the processor(s) 202 may generate an MsgB MAC PDU containing a RAP ID for the RAP, and control the transceiver(s) 206 to transmit the MsgB MAC PDU during an MsgB/RAR window for the first device 100.

The examples of the present disclosure may be applied independently, or two or more of them may be applied together.

A UE may perform operations according to some implementations of the present disclosure. The UE may comprise at least one transceiver, at least one processor, and at least one memory that is operably connectable to the at least one processor and that stores instructions that, when executed, cause the at least one processor to perform the operations according to some implementations of the present disclosure. A device for a UE may comprise at least one processor, and at least one memory that is operably connectable to the at least one processor and that stores instructions that, when executed, cause the at least one processor to perform the operations according to some implementations of the present disclosure. A computer readable storage medium may stores at least one computer program including instructions that, when executed by at least one processor, causes the at least one processor to perform at least one processor, and at least one memory that is operably connectable to the at least one processor and that stores instructions that, when executed, cause the at least one processor to perform the operations according to some implementations of the present disclosure. The operations may comprise: transmitting a random access preamble (RAP) on a physical random access channel (PRACH) and a common control channel (CCCH) service data unit (SDU) on a physical uplink shared channel (PUSCH); and receiving a medium access control (MAC) protocol data unit (PDU) based on transmitting the RAP and the CCCH SDU. The MAC PDU includes a MAC subheader, and the MAC subheader includes a first indicator field regarding whether the MAC subheader include an RAP identity (ID) or not. The MAC subheader further includes a second indicator field regarding whether the MAC subheader includes a backoff indicator field or not, based on the first indicator field set to a value indicating that the MAC subheader does not include an RAP ID. The operations may further comprise: determining whether a CRID included in the CRID field matches the CCCH SDU. The operations may further comprise: processing a timing advance command related to the CRID based on determining that the CRID included in the CRID field matches the CCCH SDU. The operations may further comprise: processing a cell radio network temporary identity (C-RNTI) related to the CRID based on determining that the CRID included in the CRID field matches the CCCH SDU.

A BS may perform operations according to some implementations of the present disclosure. The BS may comprise at least one transceiver, at least one processor, and at least one memory that is operably connectable to the at least one processor and that stores instructions that, when executed, cause the at least one processor to perform the operations according to some implementations of the present disclosure. The operations may comprise: receiving a random access preamble (RAP) on a physical random access channel (PRACH) and a common control channel (CCCH) service data unit (SDU) on a physical uplink shared channel (PUSCH) from a user equipment (UE); generating a medium access control (MAC) protocol data unit (PDU) based on receiving the RAP and the CCCH SDU; and transmitting the MAC PDU to the UE. Generating the MAC PDU may comprise: generating the MAC PDU to a MAC subheader such that the MAC subheader includes a first indicator field regarding whether the MAC subheader include an RAP identity (ID) or not. Generating the MAC PDU may comprise: generating the MAC PDU to a MAC subheader such that the MAC subheader further includes a second indicator field regarding whether the MAC subheader includes a backoff indicator field or not, based on the first indicator field set to a value indicating that the MAC subheader does not include an RAP ID. Generating the MAC PDU may further comprise generating the MAC PDU such that the MAC PDU include a timing advance command and/or a C-RNTI related to a CRID included in a CRID field, based on the MAC PDU including the CRID field.

The MAC PDU may further include a CRID field related to the MAC subheader based on the second indicator field set to a value indicating that the MAC subheader does not include a backoff indicator field The MAC subheader may not include the second indicator field, based on the first indicator field set to a value indicating that the MAC PDU includes an RAP ID.

The MAC PDU may not include the CRID field related to the MAC subheader, based on the second indicator set to a value indicating that the MAC subheader includes a backoff indicator field.

According to some implementations of the present disclosure, a UE can correctly and quickly decode/obtain a CRID, a success RAR, and/or a MAC SDU from an MsgB MAC PDU when one or more RARs for different UEs are multiplexed into a MAC PDU, whereby the UE processing delay/overhead of the MAC PDU decoding can be reduced and the UE power consumption can be saved.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

The implementations of the present disclosure are applicable to a network node (e.g., BS), a UE, or other devices in a wireless communication system.

The invention claimed is:

1. A method for performing a random access (RA) procedure by a user equipment (UE) in a wireless communication system, the method comprising:
   transmitting a random access preamble (RAP) on a physical random access channel (PRACH) and a common control channel (CCCH) service data unit (SDU) on a physical uplink shared channel (PUSCH); and
   receiving a medium access control (MAC) protocol data unit (PDU) based on transmitting the RAP and the CCCH SDU,
   wherein the MAC PDU includes a MAC subheader,
   wherein the MAC subheader includes a first indicator field regarding whether the MAC subheader includes an RAP identity (ID) or not,
   wherein the MAC subheader further includes a second indicator field regarding whether the MAC subheader includes a backoff indicator field or not, based on the first indicator field set to a value indicating that the MAC subheader does not include an RAP ID, and
   wherein the MAC PDU further includes a contention resolution identity (CRID) field related to the MAC subheader based on the second indicator field set to a value indicating that the MAC subheader does not include a backoff indicator field.

2. The method according to claim 1, further comprising:
   determining whether a CRID included in the CRID field matches the CCCH SDU; and
   processing a timing advance command related to the CRID based on determining that the CRID included in the CRID field matches the CCCH SDU.

3. The method according to claim 1, further comprising:
   determining whether a CRID included in the CRID field matches the CCCH SDU; and processing a cell radio network temporary identity (C-RNTI) related to the CRID based on determining that the CRID included in the CRID field matches the CCCH SDU.

4. The method according to claim 1, wherein the MAC subheader does not include the second indicator field, based on the first indicator field set to a value indicating that the MAC PDU includes an RAP ID.

5. The method according to claim 1, wherein the MAC PDU does not include the CRID field related to the MAC subheader, based on the second indicator set to a value indicating that the MAC subheader includes a backoff indicator field.

6. A user equipment (UE) of performing a random access (RA) procedure in a wireless communication system, the UE comprising:
   at least one transceiver;
   at least one processor; and
   at least one computer memory storing instructions which, when executed, cause the at least one processor to perform operations comprising:
   transmitting a random access preamble (RAP) on a physical random access channel (PRACH) and a common control channel (CCCH) service data unit (SDU) on a physical uplink shared channel (PUSCH); and
   receiving a medium access control (MAC) protocol data unit (PDU) based on transmitting the RAP and the CCCH SDU,
   wherein the MAC PDU includes a MAC subheader,
   wherein the MAC subheader includes a first indicator field regarding whether the MAC subheader includes an RAP identity (ID) or not, and
   wherein the MAC subheader further includes a second indicator field regarding whether the MAC subheader includes a backoff indicator field or not, based on the first indicator field set to a value indicating that the MAC subheader does not include an RAP ID, and
   wherein the MAC PDU further includes a contention resolution identity (CRID) field related to the MAC subheader based on the second indicator field set to a value indicating that the MAC subheader does not include a backoff indicator field.

7. The UE according to claim 6, wherein the operations further comprise:
   determining whether a CRID included in the CRID field matches the CCCH SDU; and
   processing a timing advance command related to the CRID based on determining that the CRID included in the CRID field matches the CCCH SDU.

8. The UE according to claim 6, wherein the operations further comprise:
   determining whether a CRID included in the CRID field matches the CCCH SDU; and
   processing a cell radio network temporary identity (C-RNTI) related to the CRID based on determining that the CRID included in the CRID field matches the CCCH SDU.

9. The UE according to claim 6, wherein the MAC subheader does not include the second indicator field, based on the first indicator field set to a value indicating that the MAC PDU includes an RAP ID.

10. The UE according to claim 6, wherein the MAC PDU does not include the CRID field related to the MAC subheader, based on the second indicator set to a value indicating that the MAC subheader includes a backoff indicator field.

11. A method for transmitting a medium access control (MAC) protocol data unit (PDU) of a random access (RA) procedure by a base station (BS) in a wireless communication system, the method comprising:
   receiving a random access preamble (RAP) on a physical random access channel (PRACH) and a common control channel (CCCH) service data unit (SDU) on a physical uplink shared channel (PUSCH) from a user equipment (UE);
   generating a medium access control (MAC) protocol data unit (PDU) based on receiving the RAP and the CCCH SDU; and
   transmitting the MAC PDU to the UE
   wherein the MAC PDU includes a MAC subheader,
   wherein the MAC subheader includes a first indicator field regarding whether the MAC subheader includes an RAP identity (ID) or not, and
   wherein the MAC subheader further includes a second indicator field regarding whether the MAC subheader includes a backoff indicator field or not, based on the first indicator field set to a value indicating that the MAC subheader does not include an RAP ID, and
   wherein the MAC PDU further includes a contention resolution identity (CRID) field related to the MAC subheader based on the second indicator field set to a value indicating that the MAC subheader does not include a backoff indicator field.

* * * * *